US012145164B2

(12) United States Patent
Zimmerman

(10) Patent No.: US 12,145,164 B2
(45) Date of Patent: Nov. 19, 2024

(54) MOBILE AUTOMOTIVE SPRAY ENCLOSURE

(71) Applicant: 2578967 ONTARIO INC., Port Robinson (CA)

(72) Inventor: Timothy Zimmerman, Port Colborne (CA)

(73) Assignee: 2578967 ONTARIO INC., Port Robinson (CA)

( * ) Notice: Subject to any disclaimer, the term of this patent is extended or adjusted under 35 U.S.C. 154(b) by 471 days.

(21) Appl. No.: 17/523,308

(22) Filed: Nov. 10, 2021

(65) Prior Publication Data

US 2022/0152644 A1 May 19, 2022

Related U.S. Application Data

(60) Provisional application No. 63/190,862, filed on May 20, 2021, provisional application No. 63/115,787, filed on Nov. 19, 2020.

(51) Int. Cl.
*A62C 37/40* (2006.01)
*A62C 3/06* (2006.01)
(Continued)

(52) U.S. Cl.
CPC ................ *B05B 16/80* (2018.02); *A62C 3/06* (2013.01); *A62C 37/40* (2013.01); *B05B 16/60* (2018.02)

(58) Field of Classification Search
CPC ........... B05B 16/80; B05B 16/60; A62C 3/06; A62C 37/40
See application file for complete search history.

(56) References Cited

U.S. PATENT DOCUMENTS 5,259,879 A * 11/1993 Khattab .................. B05B 16/40 118/309
5,755,246 A * 5/1998 Carl ........................ B05B 16/90 134/131
(Continued)

FOREIGN PATENT DOCUMENTS

WO WO-2012068611 A1 * 5/2012 ......... B05B 15/1214

OTHER PUBLICATIONS

CAMFIL, CamCarb PG.
(Continued)

*Primary Examiner* — Joseph A Greenlund
(74) *Attorney, Agent, or Firm* — Riches, McKenzie & Herbert LLP

(57) ABSTRACT

A mobile automotive spray booth having a collapsible enclosure and a fire suppression system. The fire suppression system includes a control unit, a fire detection cable or cable assembly in communication with the control unit, and a fire extinguisher assembly in communication with the control unit. The fire detection cable or cable assembly extends across at least a portion of the collapsible enclosure, and is configured to detect a fire within the collapsible enclosure. The control unit is configured to activate the fire extinguisher assembly to extinguish the fire upon detection of the fire by the fire detection cable or cable assembly. The fire detection cable or cable assembly is configured to bend to allow the collapsible enclosure to collapse from an expanded configuration to a collapsed configuration without removal or disassembly of the fire detection cable or cable assembly.

12 Claims, 30 Drawing Sheets

(51) Int. Cl.

*B05B 16/60* (2018.01)
*B05B 16/80* (2018.01)

(56) References Cited

U.S. PATENT DOCUMENTS

| | | | | | |
|---|---|---|---|---|---|
| 5,853,215 | A * | 12/1998 | Lowery | B60P 3/14 | 296/24.32 |
| 6,402,613 | B1 * | 6/2002 | Teagle | F24F 1/0071 | 454/341 |
| 7,134,444 | B2 * | 11/2006 | Mintie | E04H 15/50 | 135/900 |
| 7,188,636 | B1 * | 3/2007 | Kanne | E04G 21/243 | 135/900 |
| 9,447,601 | B2 * | 9/2016 | Maillis | E04H 15/50 | |
| 9,776,223 | B2 * | 10/2017 | Rankin | E04H 15/14 | |
| 10,039,681 | B2 * | 8/2018 | Ballantyne | E04H 1/1277 | |
| 10,717,103 | B2 * | 7/2020 | Williams | B05B 16/40 | |
| 11,680,719 | B1 * | 6/2023 | Browne | F24F 13/0227 | 454/200 |
| 2005/0155407 | A1 * | 7/2005 | Wagner | G01N 33/0063 | 73/23.2 |
| 2007/0092657 | A1 * | 4/2007 | Ferguson | B05B 16/60 | 427/372.2 |
| 2007/0095279 | A1 * | 5/2007 | Langeman | B05B 16/40 | 454/50 |
| 2009/0253360 | A1 * | 10/2009 | Tafoya | B08B 15/02 | 454/50 |
| 2010/0272915 | A1 * | 10/2010 | Laws | B05B 16/40 | 454/52 |
| 2015/0017897 | A1 * | 1/2015 | Wiliams | E04H 1/1205 | 454/51 |
| 2016/0228800 | A1 * | 8/2016 | Walk | B01D 46/2411 | |
| 2016/0263410 | A1 * | 9/2016 | Enk, Sr. | A62C 99/0036 | |
| 2017/0120089 | A1 * | 5/2017 | Fisher | A62C 35/10 | |
| 2019/0015861 | A1 * | 1/2019 | Mariani | E04H 15/44 | |
| 2022/0152644 | A1 * | 5/2022 | Zimmerman | B05B 14/43 | |

OTHER PUBLICATIONS

CAMBIL, Farr 30-30.
CAMSORB, 3CF Glide Pack.
CAMFIL, Dual 9.
CAMFIL, Filtra 2000.
DETCON Inc., Gas Sensor.
CAMFIL, GlidePack Multitrack 25.
CAMFIL, Glidepack.
CAMFIL, Hi-Flo.
CAMFIL, Magna Pack.
Paint Pockets.
ITM Instruments Inc., Pressure Gauges.
Twin City.
Vertical Ozone Tornado.

* cited by examiner

MOBILE AUTOMOTIVE SPRAY ENCLOSURE

RELATED APPLICATIONS

This application claims priority to the Nov. 19, 2020 filing date of U.S. Provisional Patent Application No. 63/115,787, and to the May 20, 2021 filing date of U.S. Provisional Patent Application No. 63/190,862, both of which are incorporated herein by reference.

FIELD OF THE INVENTION

This invention relates to spray booths for spray painting vehicles, and more particularly to mobile spray booths that can be moved from one location to another

BACKGROUND OF THE INVENTION

It is known to spray paint vehicles such as automobiles in a spray booth, which is an enclosure that serves to reduce or eliminate the release of contaminants such as solvents and paint particles into the external environment. Spray booths are typically provided with a ventilation and filtration system that draws fresh air into the spray booth and directs contaminated air through a filter or filters to remove the contaminants from the air before the air is expelled into the external environment.

Some spray booths are designed to be mobile, so that they can be moved from one location to another. For example, U.S. Pat. No. 9,776,223 to Rankin, issued Oct. 3, 2017, which is incorporated herein by reference, discloses a mobile spray booth having a wheel-mounted collapsible frame and a flexible outer cover that is draped over the frame. The collapsible frame is able to collapse from an extended position to a retracted position to allow the spray booth to be more easily moved.

The applicant has appreciated a disadvantage of at least some previously known mobile spray booths is that the fire safety systems of the spray booths need to be disconnected and/or dismantled when the spray booths are moved from one location to another. For example, some spray booths have nitrogen lines that are used to activate a fire extinguisher in the event of a fire. The nitrogen and sometimes chemical discharge lines extend across the spray enclosure and even if designed to be flexible are pressurized and have a high probability of failure the more times the lines are bent. The nitrogen or discharge lines often extend across the spray booth, and cannot be bent without risk of failure. The nitrogen lines therefore need to be disconnected and/or removed before the spray booth is collapsed from an extended position to a retracted position. Other components, such as mechanical fire detection mechanisms, may also need to be removed or disassembled before the spray booth is collapsed or cover material is changed.

The applicant has appreciated that having to remove or disassemble the fire safety system each time the mobile spray booth is moved greatly reduces its portability. Furthermore, the fire safety system typically needs to be inspected and/or re-certified each time it is disassembled and reassembled. This can lead to significant delays in resuming operation of the mobile spray booth each time it is moved to a new location or cover material is changed, as well as increased costs.

SUMMARY OF THE INVENTION

To at least partially overcome some of the disadvantages of previously known methods and devices, in one aspect the present invention provides a mobile automotive spray booth with a collapsible enclosure and a fire suppression system including a control unit, a fire detection cable or cable assembly in communication with the control unit, and a fire extinguisher assembly in communication with the control unit. The fire detection cable or cable assembly extends across at least a portion of the collapsible enclosure, and is configured to detect a fire within the collapsible enclosure. The control unit is configured to activate the fire extinguisher assembly to extinguish the fire upon detection of the fire by the fire detection cable or cable assembly. The fire detection cable or cable assembly is configured to bend to allow the collapsible enclosure to collapse from an expanded configuration to a collapsed configuration without removal or disassembly of the fire detection cable or cable assembly.

The applicant has appreciated that using a flexible fire detection cable or cable assembly can preferably reduce or eliminate the need to disassemble the fire suppression system when the collapsible enclosure is collapsed from the expanded configuration to the collapsed configuration or cover material is changed. This preferably increases the mobility of the mobile automotive spray booth, and reduces the cost, time, and complexity of moving the mobile spray booth from one location to another and of maintenance.

Preferably, the fire extinguisher assembly includes an agent cylinder containing a fire extinguishing agent, and an electronic actuator that is operatively connected to the agent cylinder for activating the agent cylinder upon receipt of an electronic activation signal from the control unit. The fire suppression system also preferably includes an electronic actuator cable for carrying the electronic activation signal from the control unit to the electronic actuator, the electronic actuator cable extending across at least part of the collapsible enclosure and being configured to bend to allow the collapsible enclosure to collapse from the expanded configuration to the collapsed configuration without removal or disassembly of the electronic actuator cable, and eliminating failure that might otherwise occur due to pressurized nitrogen lines or the like being bent.

The applicant has appreciated that using an electronic actuator and a flexible electronic actuator cable preferably further reduces the need to disassemble the fire suppression system when the collapsible enclosure is collapsed from the expanded configuration to the collapsed configuration. For example, using a flexible electronic actuator cable preferably reduces or eliminates the need for long nitrogen lines that extend across the collapsible enclosure and that need to be disassembled when the collapsible enclosure is collapsed.

Preferably, a collapsible frame of the collapsible enclosure has a terminal frame member whose width in a longitudinal direction remains unchanged when the collapsible enclosure moves between the collapsed configuration and the expanded configuration. The terminal frame member may, for example, include a first archway defining body, a second archway defining body, and a metallic sheet that extends between the first archway defining body and the second archway defining body. The applicant has appreciated that by mounting the fire extinguisher assembly to the terminal frame member, the collapsible enclosure can preferably be collapsed from the expanded configuration to the collapsed configuration and the cover can be changed without having to remove or disassemble the fire extinguisher assembly.

Mounting the fire extinguisher assembly to the terminal frame member also preferably allows the fire extinguisher assembly to be mounted without having to pierce a flexible cover of the collapsible enclosure, and thus preferably reduces the risk of contaminants escaping from the collapsible enclosure through a hole in the flexible cover.

Accordingly, in one aspect the present invention resides in a mobile automotive spray booth comprising: a collapsible enclosure for receiving a vehicle to be spray painted, the collapsible enclosure having a collapsed configuration and an expanded configuration; and a fire suppression system comprising: a control unit; a fire detection cable or cable assembly in communication with the control unit; and a fire extinguisher assembly in communication with the control unit; wherein the fire detection cable or cable assembly extends across at least a portion of the collapsible enclosure, and is configured to detect a fire within the collapsible enclosure; wherein the control unit is configured to activate the fire extinguisher assembly to extinguish the fire upon detection of the fire by the fire detection cable or cable assembly; and wherein the fire detection cable or cable assembly is configured to bend to allow the collapsible enclosure to collapse from the expanded configuration to the collapsed configuration without removal or disassembly of the fire detection cable or cable assembly.

In some embodiments, the fire extinguisher assembly comprises: an agent cylinder containing a fire extinguishing agent; and an electronic actuator that is operatively connected to the agent cylinder; wherein the fire suppression system further comprises an electronic actuator cable that extends from the control unit to the electronic actuator; wherein the control unit is configured to send an electronic activation signal to the electronic actuator via the electronic actuator cable upon detection of the fire by the fire detection cable or cable assembly; wherein the electronic actuator is configured to activate the agent cylinder to expel the fire extinguishing agent upon receipt of the electronic activation signal from the control unit; and wherein the electronic actuator cable extends across at least part of the collapsible enclosure, and is configured to bend to allow the collapsible enclosure to collapse from the expanded configuration to the collapsed configuration without removal or disassembly of the electronic actuator cable.

In some embodiments, the mobile automotive spray booth has a first end and a second end; wherein the fire extinguisher assembly is located at the first end and the control unit is located at the second end; and wherein the first end is closer to the second end when the collapsible enclosure is in the collapsed configuration than when the collapsible enclosure is in the expanded configuration.

In some embodiments, the collapsible enclosure comprises a flexible cover that is supported by a collapsible frame; wherein the collapsible frame has an extended length in a longitudinal direction when the collapsible enclosure is in the expanded configuration; wherein the collapsible frame has a reduced length in the longitudinal direction when the collapsible enclosure is in the collapsed configuration, the extended length being greater than the reduced length; wherein the collapsible frame has a terminal frame member located at the first end of the mobile automotive spray booth; and wherein the fire extinguisher assembly is mounted to the terminal frame member.

In some embodiments, the terminal frame member has a width in the longitudinal direction that remains unchanged when the collapsible enclosure moves between the collapsed configuration and the expanded configuration, so as to allow the collapsible enclosure to collapse from the expanded configuration to the collapsed configuration without removal or disassembly of the fire extinguisher assembly.

In some embodiments, the terminal frame member comprises: a first archway defining body; a second archway defining body; and at least one metallic sheet or panel; wherein the second archway defining body is spaced from the first archway defining body in the longitudinal direction; wherein the at least one metallic sheet or panel extends between the first archway defining body and the second archway defining body in the longitudinal direction; and wherein the fire extinguisher assembly is mounted to the at least one metallic sheet or panel, without piercing the flexible cover.

In some embodiments, the terminal frame member has a right side portion, a top portion, and a left side portion; wherein the fire extinguisher assembly further comprises at least one nozzle that is operatively connected to the agent cylinder for discharge of the fire extinguishing agent into an internal compartment of the collapsible enclosure upon activation of the agent cylinder; wherein the at least one nozzle is mounted to the top portion of the terminal frame member; and wherein the at least one nozzle is configured to discharge the fire extinguishing agent in a multidirectional spray that encompasses at least half of an internal volume of the internal compartment and extends in the longitudinal direction towards the second end of the mobile automotive spray booth for at least half of the extended length of the collapsible frame.

The nozzles preferably discharge from the end forward, eliminating the need for discharge nozzles along the length of the enclosure as in standard systems. This eliminates the need for flexible discharge lines along the enclosure and the need to pierce the cover for nozzles along the enclosure length.

In some embodiments, the spray booth further comprises an air filtration and ventilation system for directing air through the collapsible enclosure and filtering air expelled from the collapsible enclosure; wherein the fire extinguisher assembly is a first fire extinguisher assembly, the fire suppression system further comprising a second fire extinguisher assembly; wherein the agent cylinder is a first agent cylinder, the electronic actuator is a first electronic actuator, and the at least one nozzle is a first nozzle or set of nozzles; wherein the first fire extinguisher assembly further comprises a first nitrogen actuation cylinder and a first actuation hose; wherein the first electronic actuator is operatively connected to the first nitrogen actuation cylinder, the first electronic actuator being configured to activate the first nitrogen actuation cylinder upon receipt of the electronic activation signal from the control unit; wherein the first nitrogen actuation cylinder is configured to, upon activation of the first nitrogen actuation cylinder, deliver pressurized nitrogen to the first agent cylinder via the first actuation hose to thereby activate the first agent cylinder; wherein the second fire extinguisher assembly comprises: a second agent cylinder containing the fire extinguishing agent; a second nozzle or set of nozzles that is operatively connected to the second agent cylinder for discharge of the fire extinguishing agent into the internal compartment of the collapsible enclosure upon activation of the second agent cylinder; a second nitrogen actuation cylinder; a second actuation hose; and a second electronic actuator in communication with the control unit; wherein the second electronic actuator is configured to activate the second nitrogen actuation cylinder upon receipt of activation instructions from the control unit; wherein the second nitrogen actuation cylinder is configured to, upon activation of the second nitrogen actuation cylinder, deliver pressurized nitrogen to the second agent cylinder via the second actuation hose to thereby activate the second agent cylinder; wherein the air filtration and ventilation system comprises a filter unit that carries one or more filters for filtering the air expelled from the collapsible enclosure, the filter unit being located at the second end of the mobile automotive spray booth; wherein the collapsible enclosure has a filter unit attachment end and a vehicle entrance end, the vehicle entrance end being located at the first end of the mobile automotive spray booth and the filter unit attachment end being located at the second end of the mobile automotive spray booth; wherein the terminal frame member is a first terminal frame member, the collapsible frame further comprising a second terminal frame member located at the filter unit attachment end of the collapsible enclosure; wherein the second terminal frame member has a right side portion, a top portion, and a left side portion; wherein the second nozzle or set of nozzles is mounted to the top portion of the second terminal frame member without piercing the flexible cover; wherein the second nozzle or set of nozzles is configured to discharge the fire extinguishing agent in a multidirectional spray that encompasses at least half of the internal volume of the internal compartment and extends in the longitudinal direction towards the vehicle entrance end of the collapsible enclosure for at least half of the extended length of the collapsible frame; and wherein the second terminal frame member has a width in the longitudinal direction that remains unchanged when the collapsible enclosure moves between the collapsed configuration and the expanded configuration, so as to allow the collapsible enclosure to collapse from the expanded configuration to the collapsed configuration without removal or disassembly of the second nozzle or set of nozzles.

In some preferred embodiments, the nozzles provide a focused directional spray.

In some embodiments, the filter unit also carries the control unit, a fan, a sensor device, and a drive unit; wherein the drive unit provides electric power to the control unit, to the fan, to the sensor device, and to a spray paint apparatus for spray painting the vehicle; and wherein the drive unit is configured to perform a diagnostic routine to confirm that the fire suppression system and the sensor device are operational before providing power to the spray paint apparatus.

In some embodiments, the filter unit comprises a horizontal base that carries a fan support member, a funnel member, and a filter assembly; wherein the fan support member comprises: a vertical plate having a central opening for carrying the fan; and a right side vertical support rib and a left side vertical support rib that extend from a right side of the vertical plate and a left side of the vertical plate, respectively, the right side vertical support rib and the left side vertical support rib extending away from the filter unit attachment end of the collapsible enclosure; wherein the funnel member has a funnel shaped body with a first open end and a larger second open end, the first open end positioned adjacent to an air intake side of the fan and the second open end positioned adjacent to the filter assembly; wherein the filter assembly comprises a first stage filter, a second stage filter, a third stage filter, and a fourth stage filter; wherein the first stage filter is positioned adjacent to the filter unit attachment end of the collapsible enclosure for receiving air from the internal compartment of the collapsible enclosure; wherein the second stage filter is positioned adjacent to the first stage filter for receiving air filtered by the first stage filter; wherein the third stage filter is positioned adjacent to the second stage filter for receiving air filtered by the second stage filter; wherein the fourth stage filter is positioned adjacent to the third stage filter for receiving air filtered by the third stage filter; wherein the second open end of the funnel member is positioned adjacent to the fourth stage filter for receiving air filtered by the fourth stage filter; wherein the fan draws air from the internal compartment through the filter assembly and the funnel member, and exhausts filtered air out of the filter unit; wherein the sensor device is mounted on the filter unit for detecting contaminants in the exhausted filtered air; wherein the first stage filter comprises an overspray arrestor; wherein the second stage filter comprises a MERV 13 multi-pocket filter; wherein the third stage filter comprises a carbon filter; and wherein the fourth stage filter comprises a MERV 8 pleated panel filter.

In some preferred embodiments the third stage filter is a carbon filled filter panel assembly. In some preferred embodiments granular carbon filled filter panels are used, rather than carbon impregnated filters.

In some embodiments, the fire detection cable or cable assembly extends at least from the filter unit attachment end of the collapsible enclosure to the vehicle entrance end of the collapsible enclosure.

In some embodiments, the fire detection cable or cable assembly has at least one transverse portion that extends across a top portion of the collapsible enclosure from a left side portion of the collapsible enclosure to a right side portion of the collapsible enclosure.

In some embodiments, the at least one transverse portion comprises: a first transverse portion; a second transverse portion that is spaced from the first transverse portion, and is located closer to the vehicle entrance end than the first transverse portion is to the vehicle entrance end; a third transverse portion that is spaced from the second transverse portion, and is located closer to the vehicle entrance end than the second transverse portion is to the vehicle entrance end; and a fourth transverse portion that is spaced from the third transverse portion, and is located closer to the vehicle entrance end than the third transverse portion is to the vehicle entrance end.

In some embodiments, the flexible cover comprises fire retardant vinyl; and the fire detection cable or cable assembly is attached to the flexible cover by straps, without piercing the flexible cover.

In some embodiments, the fire detection cable or cable assembly is detachable from the flexible cover by unfastening the straps.

In some embodiments, the fire detection cable or cable assembly comprises a linear heat detector with two internal conductors that make contact in an overheat condition.

In some embodiments, the fire suppression system further comprises a manual pull station that is in communication with the control unit; and the control unit is configured to activate the fire extinguisher assembly to extinguish the fire upon manual activation of the manual pull station.

In another aspect, the present invention resides in a method comprising: spray painting a vehicle in a collapsible enclosure of a mobile automotive spray booth, the mobile automotive spray booth having a fire suppression system comprising a fire detection cable or cable assembly that extends across at least a portion of the collapsible enclosure; removing the vehicle from the collapsible enclosure; and collapsing the collapsible enclosure from an expanded configuration to a collapsed configuration without removing or disassembling the fire detection cable or cable assembly; wherein at least part of the fire detection cable or cable assembly bends to allow the collapsible enclosure to collapse from the expanded configuration to the collapsed configuration without removal or disassembly of the fire detection cable or cable assembly.

In another aspect, the present invention resides in a filter unit comprising a horizontal base that carries a fan support member, a funnel member, and a filter assembly; wherein the fan support member comprises: a vertical plate having a central opening for carrying a fan; and a right side vertical support rib and a left side vertical support rib that extend from a right side of the vertical plate and a left side of the vertical plate, respectively; wherein the funnel member has a funnel shaped body with a first open end and a larger second open end, the first open end positioned adjacent to an air intake side of the fan and the second open end positioned adjacent to the filter assembly; wherein the filter assembly comprises a first stage filter, a second stage filter, a third stage filter, and a fourth stage filter; wherein the second stage filter is positioned adjacent to the first stage filter for receiving air filtered by the first stage filter; wherein the third stage filter is positioned adjacent to the second stage filter for receiving air filtered by the second stage filter; wherein the fourth stage filter is positioned adjacent to the third stage filter for receiving air filtered by the third stage filter; wherein the second open end of the funnel member is positioned adjacent to the fourth stage filter for receiving air filtered by the fourth stage filter; and wherein the fan draws air through the filter assembly and the funnel member, and exhausts filtered air out of the filter unit.

In some embodiments, the filter unit further comprises an ozone generator.

In some embodiments, the ozone generator is configured to inject ozone into the exhausted filtered air.

In some embodiments, at least one of the first stage filter, the second stage filter, the third stage filter, and the fourth stage filter comprises a carbon filter; and the ozone generator is configured to inject ozone into the carbon filter.

In some embodiments, the first stage filter comprises an overspray arrestor-type filter; wherein the second stage filter comprises a HEPA filter; wherein the third stage filter comprises the carbon filter; and wherein the fourth stage filter comprises a MERV 9 pleated filter.

In another aspect, the present invention resides in a fire suppression system for a mobile automotive spray booth, the fire suppression system comprising: a control unit; a fire detection cable or cable assembly in communication with the control unit; and a fire extinguisher assembly in communication with the control unit; wherein the fire detection cable or cable assembly is configured to extend across at least a portion of a collapsible enclosure of the mobile automotive spray booth, and is configured to detect a fire within the collapsible enclosure; wherein the control unit is configured to activate the fire extinguisher assembly to extinguish the fire upon detection of the fire by the fire detection cable or cable assembly; and wherein the fire detection cable or cable assembly is configured to bend to allow the collapsible enclosure to collapse from an expanded configuration to a collapsed configuration.

In another aspect, the present invention resides in a method of installing a fire suppression system in a mobile automotive spray booth, the method comprising: attaching a control unit to the mobile automotive spray booth; arranging a fire detection cable or cable assembly to extend across at least a portion of a collapsible enclosure of the mobile automotive spray booth, such that the fire detection cable or cable assembly bends to allow the collapsible enclosure to collapse from an expanded configuration to a collapsed configuration; and attaching a fire extinguisher assembly to the mobile automotive spray booth; wherein the fire detection cable or cable assembly is configured to detect a fire within the collapsible enclosure; wherein the fire detection cable or cable assembly is in communication with the control unit; wherein the fire extinguisher assembly is in communication with the control unit; and wherein the control unit is configured to activate the fire extinguisher assembly to extinguish the fire upon detection of the fire by the fire detection cable or cable assembly.

BRIEF DESCRIPTION OF THE DRAWINGS

Further aspects and advantages of the invention will appear from the following description taken together with the accompanying drawings, in which.

DETAILED DESCRIPTION OF THE DRAWINGS

Figure 1:
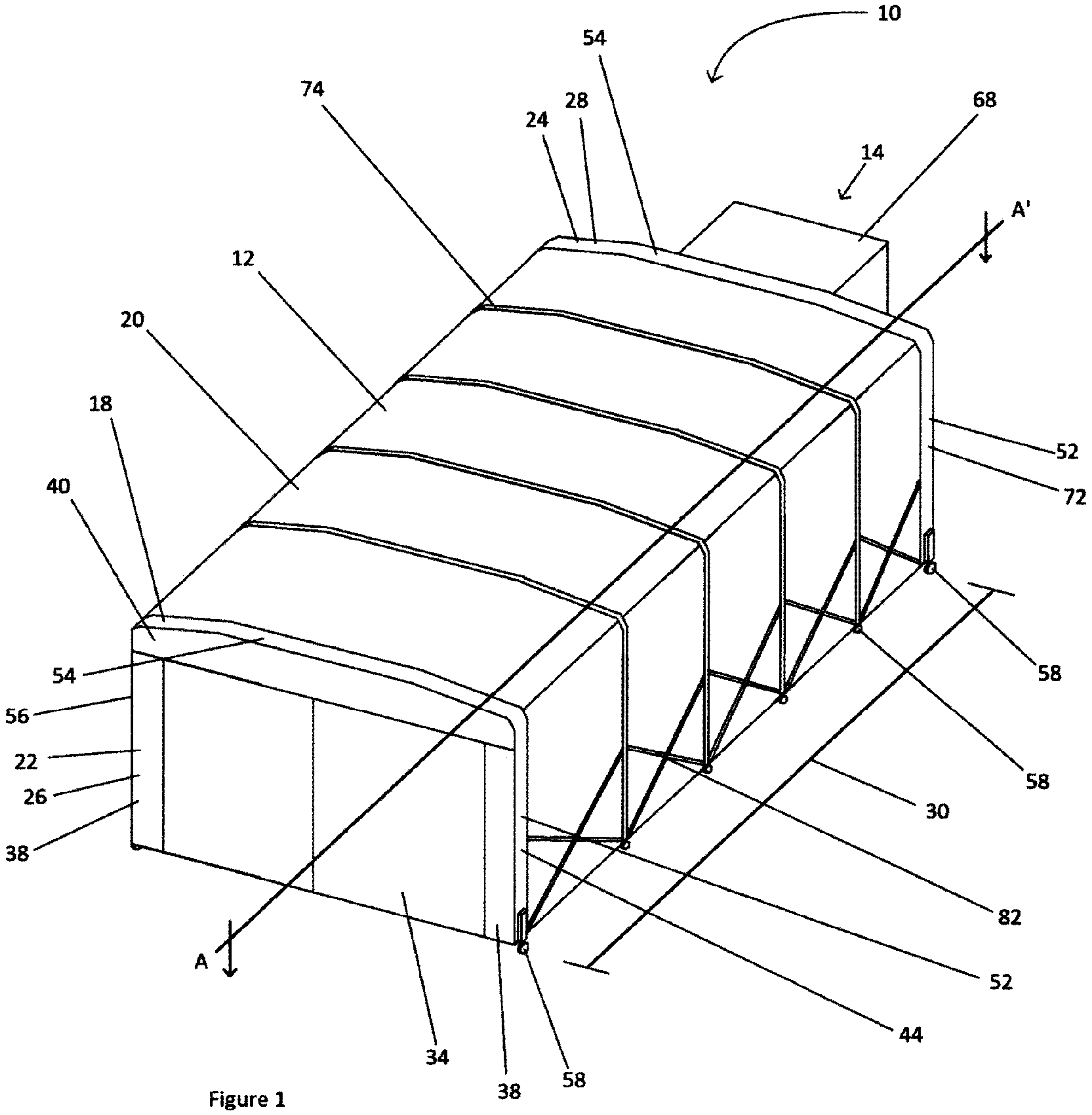
FIG. 1 is a perspective view of a mobile automotive spray booth in accordance with a first embodiment of the present invention, showing a collapsible enclosure of the spray booth at an expanded configuration.

FIGS. 1 to 17 show a mobile automotive spray booth 10 in accordance with a first embodiment of the present invention. The spray booth 10 has a collapsible enclosure 12, an air filtration and ventilation system 14, and a fire suppression system 16. As shown in FIG. 1, the collapsible enclosure 12 has a collapsible frame 18 and a flexible cover 20 that is supported by the collapsible frame 18. The frame 18 is outside of the flexible cover 20.

Figure 5:
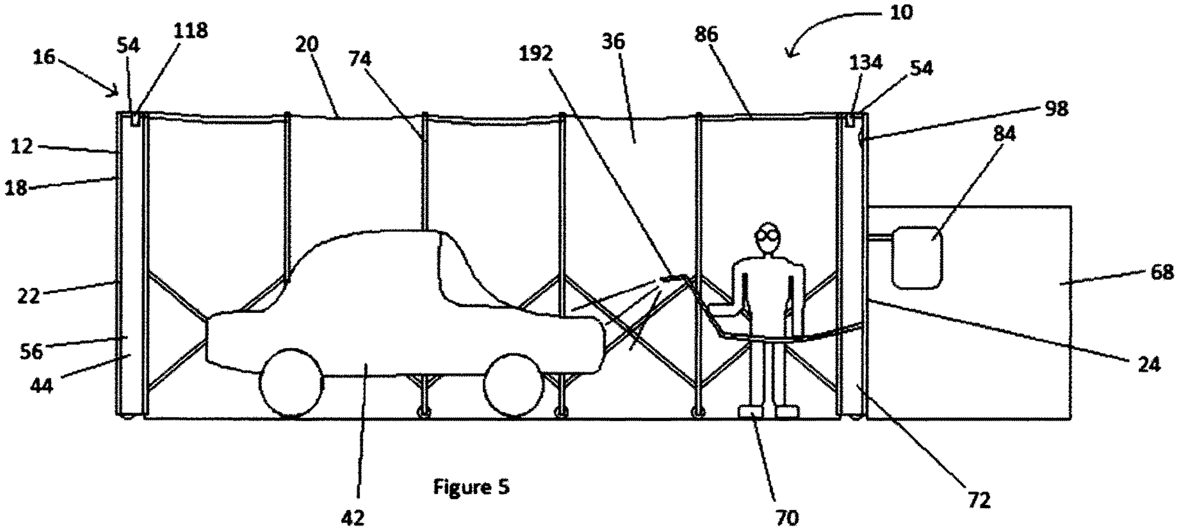
FIG. 5 is a schematic cross-sectional side view of the spray booth shown in FIG. 1, taken along line A-A' in FIG. 1, and showing a worker spray painting a vehicle inside the collapsible enclosure.

The collapsible frame 18 has a vehicle entrance end 22 and a filter unit attachment end 24. The vehicle entrance end 22 is located at a first end 26 of the spray booth 10 and the filter unit attachment end 24 is located at a second end 28 of the spray booth 10. As can be seen in FIG. 1, the vehicle entrance end 22 has two forwardly facing vehicle entrance doors 34. The vehicle entrance doors 34 can be opened to permit passage of a vehicle 42 into or out of an internal compartment 36 of the collapsible enclosure 12. The internal compartment 36 of the collapsible enclosure 12 with a vehicle 42 positioned therein is shown in FIG. 5.

As can be seen in FIG. 1, the vehicle entrance end 22 has two side panels 38, one of which is positioned to the left of the vehicle entrance doors 34 and one of which is positioned to the right of the vehicle entrance doors 34. The vehicle entrance end 22 also has a top panel 40 that is positioned above the vehicle entrance doors 34 and the side panels 38. The top panel 40 and the side panels 38 may be made from any suitable material or combination of materials, including metal bars, metal sheets, synthetic fabrics, and natural fabrics. The top panel 40 and/or the side panels 38 preferably help to support the vehicle entrance doors 34. The vehicle entrance doors 34 may, for example, be supported by a hinged connection to the side panels 38 that permits the vehicle entrance doors 34 to swing open to allow passage of a vehicle 42 into or out of the internal compartment 36.

Figure 10:
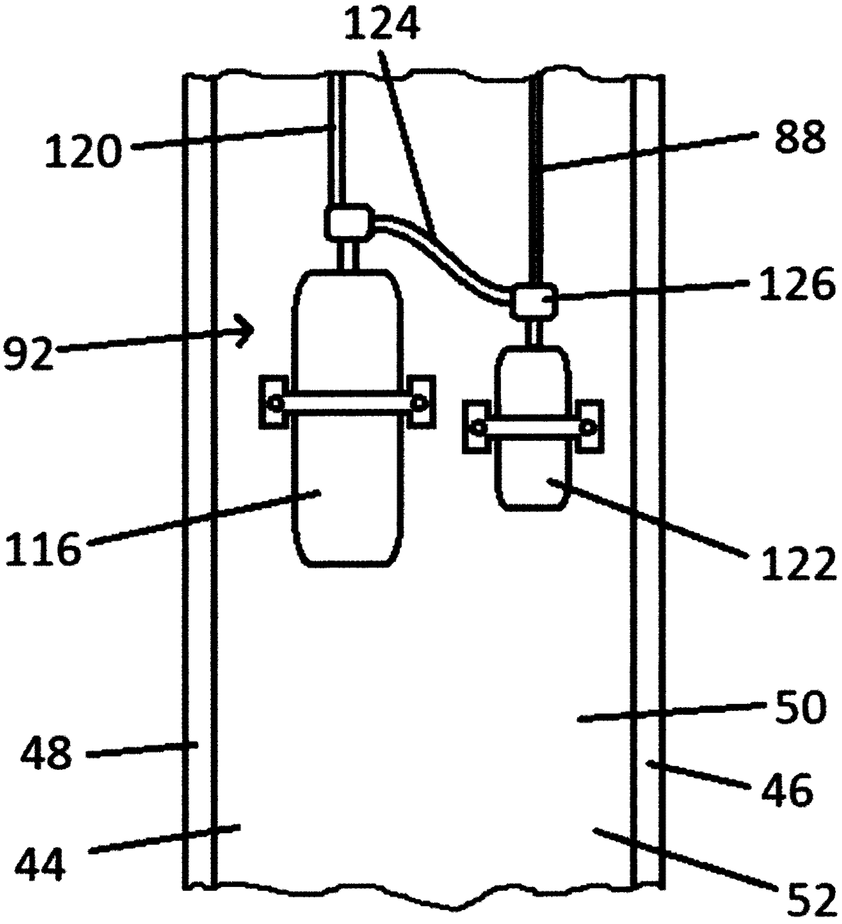
FIG. 10 is a side view of an inside surface of a right side portion of a first terminal frame member of the mobile spray booth shown in FIG. 1, showing a first fire extinguisher assembly mounted to the first terminal frame member.

As can be seen in FIG. 1, the top panel 40 and the side panels 38 at the vehicle entrance end 22 of the collapsible frame 18 are attached to and supported by a first terminal frame member 44. As best shown in FIG. 10, the first terminal frame member 44 has a first archway defining body 46, a second archway defining body 48 that is spaced from the first archway defining body 46 towards the second end 28 of the spray booth 10 in the longitudinal direction, and a metallic sheet 50 that extends between the first archway defining body 46 and the second archway defining body 48 in the longitudinal direction. The first archway defining body 46 and the second archway defining body 48 may be made from any suitable material or materials, including for example metallic bars or metallic tubing.

As can be seen in FIG. 1, the first terminal frame member 44 has a right side portion 52 that extends vertically and is spaced to the right of the vehicle entrance doors 34, a left side portion 56 that extends vertically and is spaced to the left of the vehicle entrance doors 34, and a top portion 54 that extends over the top panel 40 and connects the right side portion 52 to the left side portion 56. The bottom end of the right side portion 52 and the bottom end of the left side portion 56 each have a wheel 58, although only the wheel 58 on the right side portion 52 is fully visible in FIG. 1.

Figure 3:
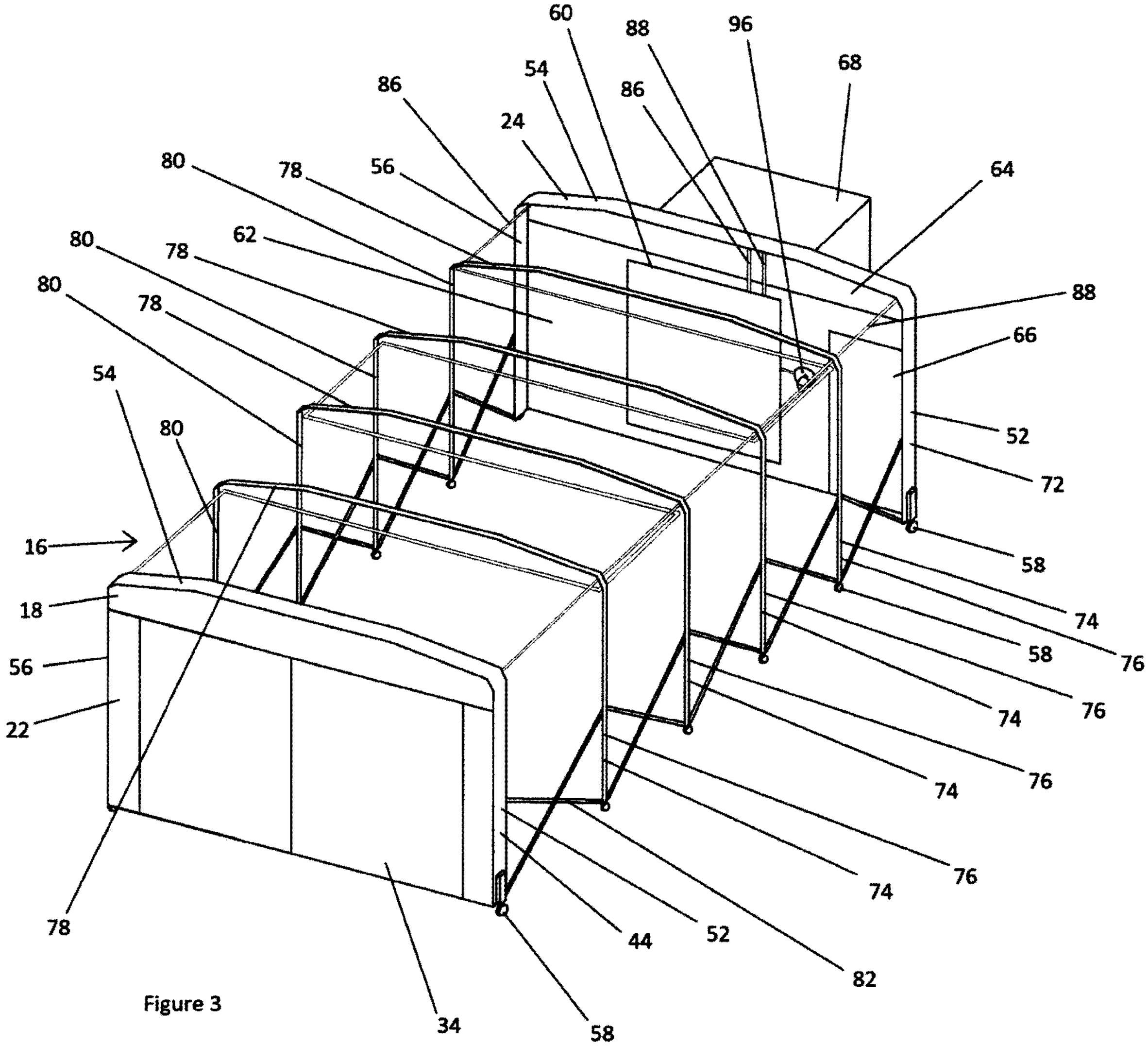
FIG. 3 is a perspective view of the spray booth shown in FIG. 1, with a flexible cover of the collapsible enclosure omitted and the collapsible enclosure at the expanded configuration.

The filter unit attachment end 24 of the collapsible frame 18 is best shown in FIG. 3. The filter unit attachment end 24 has a back cover 62, a top panel 64, and a rear door 66. The back cover 62 has a central filter unit attachment opening 60 that attaches to a filter unit 68 of the air filtration and ventilation system 14, for example using hook and loop fasteners such as Velcro™. The rear door 66 is smaller than the vehicle entrance doors 34, and can be opened to allow a worker 70 to enter or exit the internal compartment 36 of the collapsible enclosure 12. The rear door 66 may, for example, have a hinged connection to the back cover 62 that permits the rear door 66 to swing open. The rear door 66 is optionally positioned on the opposite side of the filter unit attachment end 24. The top panel 64 of the filter unit attachment end 24 is identical to the top panel 40 of the vehicle entrance end 22. The back cover 62 and the top panel 64 may be made from any suitable material or combination of materials, including metal bars, metal sheets, synthetic fabrics, and natural fabrics.

Figure 11:
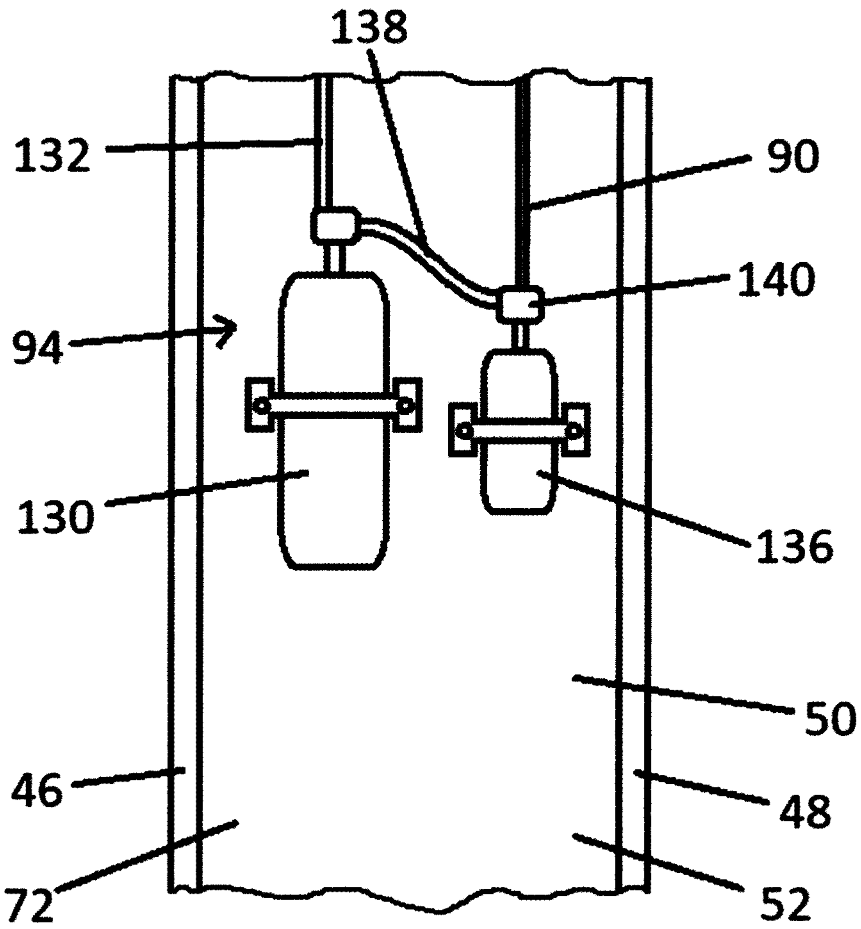
FIG. 11 is a side view of an inside surface of a right side portion of a second terminal frame member of the mobile spray booth shown in FIG. 1, showing a second fire extinguisher assembly mounted to the second terminal frame member.
Figure 12:
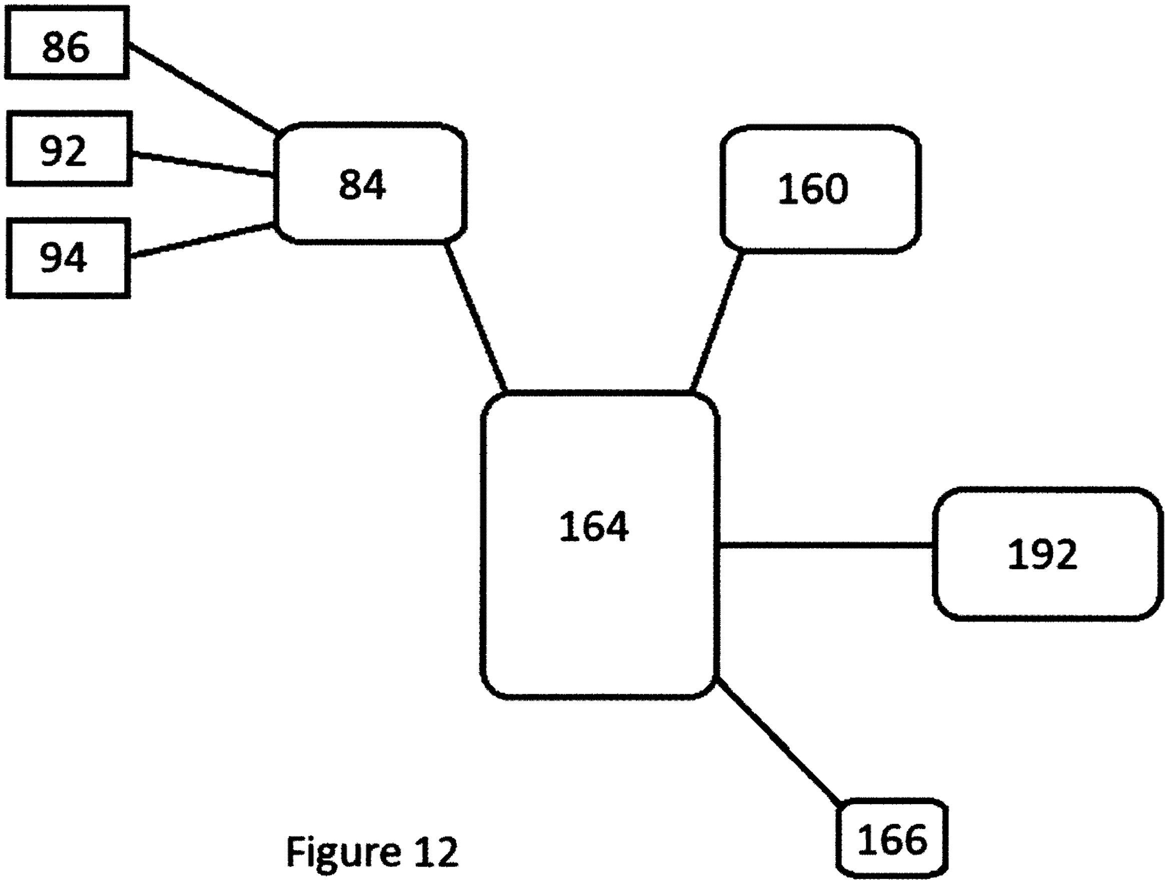
FIG. 12 is a schematic representation of a drive unit of the spray booth shown in FIG. 1, showing how the drive unit is functionally linked to other components of the spray booth.

As can be seen in FIG. 3, the top panel 64 and the back cover 62 at the filter unit attachment end 24 of the collapsible frame 18 are attached to and supported by a second terminal frame member 72. As best shown in FIG. 11, the second terminal frame member 72 has a first archway defining body 46, a second archway defining body 48 that is spaced from the first archway defining body 46 towards the first end 26 of the spray booth 10 in the longitudinal direction, and a metallic sheet 50 that extends between the first archway defining body 46 and the second archway defining body 48 in the longitudinal direction. As can be seen in FIG. 3, the second terminal frame member 72 has a right side portion 52 that extends vertically and is spaced to the right of the filter unit attachment opening 60, a left side portion 56 that extends vertically and is spaced to the left of the filter unit attachment opening 60, and a top portion 54 that extends over the top panel 64 and connects the right side portion 52 to the left side portion 56. The bottom end of the right side portion 52 and the bottom end of the left side portion 56 each have a wheel 58, although only the wheel 58 on the right side portion 52 is fully visible in FIG. 3.

The collapsible frame 18 also has four intermediate frame members 74 that are spaced from each other in the longitudinal direction and positioned between the first terminal frame member 44 and the second terminal frame member 72. Each intermediate frame member 74 has a vertical right side portion 76, a vertical left side portion 80, and a top portion 78 that connects the right side portion 76 to the left side portion 80. The bottom end of the right side portion 76 and the bottom end of the left side portion 80 of each of the intermediate frame members 74 has a wheel 58, which allows the intermediate frame members 74 to roll over a surface such as the floor of a garage. The intermediate frame members 74 may be made from any suitable material or materials, including for example metal bars or metal tubing.

The large wheels designated at 58 at the bottom of right side portion 52 and left side portion 56 are different from all other wheels designated 58. The larger wheels 58 at terminal frame members 44, 72 are jackable and swivel, and are meant to lift all smaller center wheels 58 on intermediate frame members 74 to allow for multidirectional travel of enclosure as all other wheels 58 are for longitudinal travel.

As can be seen in FIG. 3, the right side portion 76 of each intermediate frame member 74 is attached to the right side portion 76 of the adjacent intermediate frame members 74 by a scissor mechanism 82, and the left side portion 80 of each intermediate frame member 74 is attached to the left side portion 80 of the adjacent intermediate frame members 74 by a scissor mechanism 82. The right side portion 76 of the forward-most intermediate frame member 74 is also attached to the right side portion 52 of the first terminal frame member 44 by a scissor mechanism 82, and the left side portion 80 of the forward-most intermediate frame member 74 is attached to the left side portion 56 of the first terminal frame member 44 by a scissor mechanism 82. The right side portion 76 of the rearward-most intermediate frame member 74 is furthermore attached to the right side portion 52 of the second terminal frame member 72 by a scissor mechanism 82, and the left side portion 80 of the rearward-most intermediate frame member 74 is attached to the left side portion 56 of the second terminal frame member 72 by a scissor mechanism 82.

Figure 2:
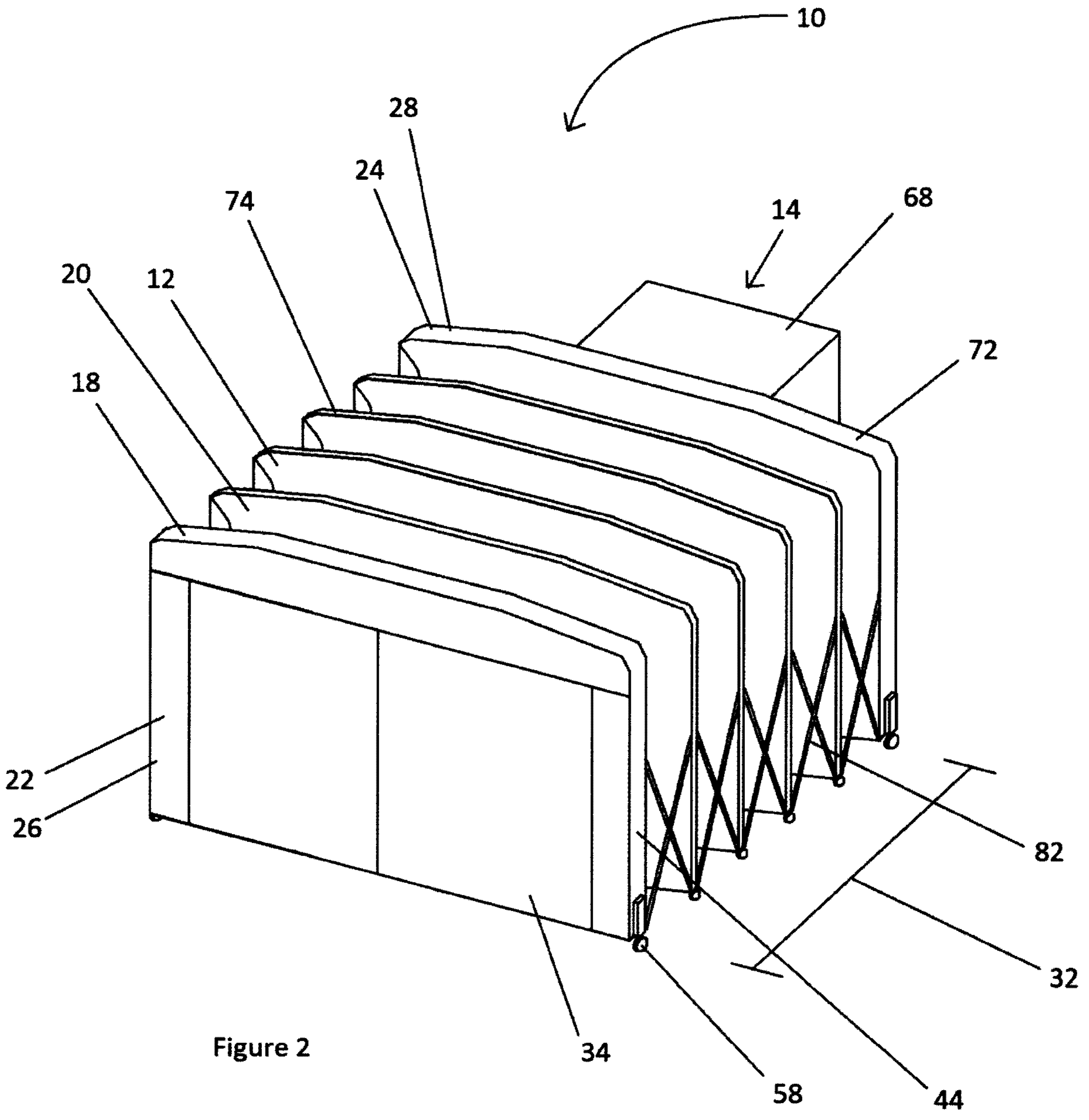
FIG. 2 is a perspective view of the spray booth shown in FIG. 1, showing the collapsible enclosure at a collapsed configuration.
Figure 4:
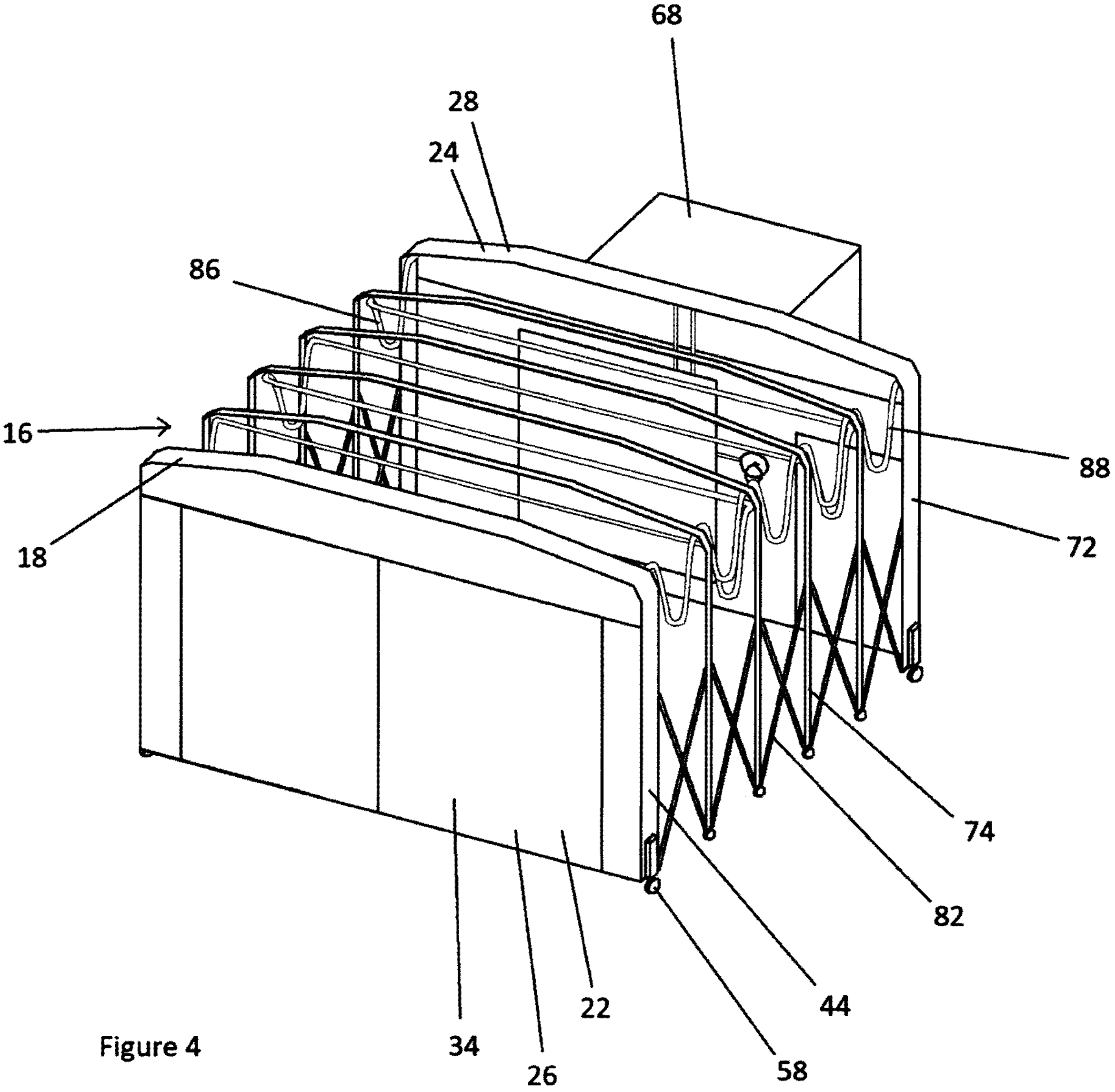
FIG. 4 is a perspective view of the spray booth shown in FIG. 1, with the flexible cover of the collapsible enclosure omitted and the collapsible enclosure at the collapsed configuration.

The scissor mechanisms 82 allow the collapsible frame 18 to move between the extended configuration shown in FIGS. 1 and 3 and the collapsed configuration shown in FIGS. 2 and 4, by increasing or decreasing the spacing between the first terminal frame member 44, the intermediate frame members 74, and the second terminal frame member 72 in the longitudinal direction. The collapsible frame 18 has an extended length 30 in the longitudinal direction when the collapsible frame 18 is in the extended configuration shown in FIG. 1, and a reduced length 32 in the longitudinal direction when the collapsible frame 18 is in the collapsed configuration shown in FIG. 2, the extended length 30 being greater than the reduced length 32.

The flexible cover 20 is preferably made from a fire proof or fire resistant material or materials, such as fire retardant vinyl. As can be seen in FIG. 1, the flexible cover 20 extends from the first terminal frame member 44 to the second terminal frame member 72. The flexible cover 20 is preferably secured to the first terminal frame member 44 and the second terminal frame member 72 in a substantially air-tight manner. Preferably, the flexible cover 20 attaches to the second archway defining body 48 of the first terminal frame member 44 and the second archway defining body 48 of the second terminal frame member 72, so that the metallic sheet 50 of the first terminal frame member 44 and the metallic sheet 50 of the second terminal frame member 72 remain uncovered by the flexible cover 20.

Figure 7:
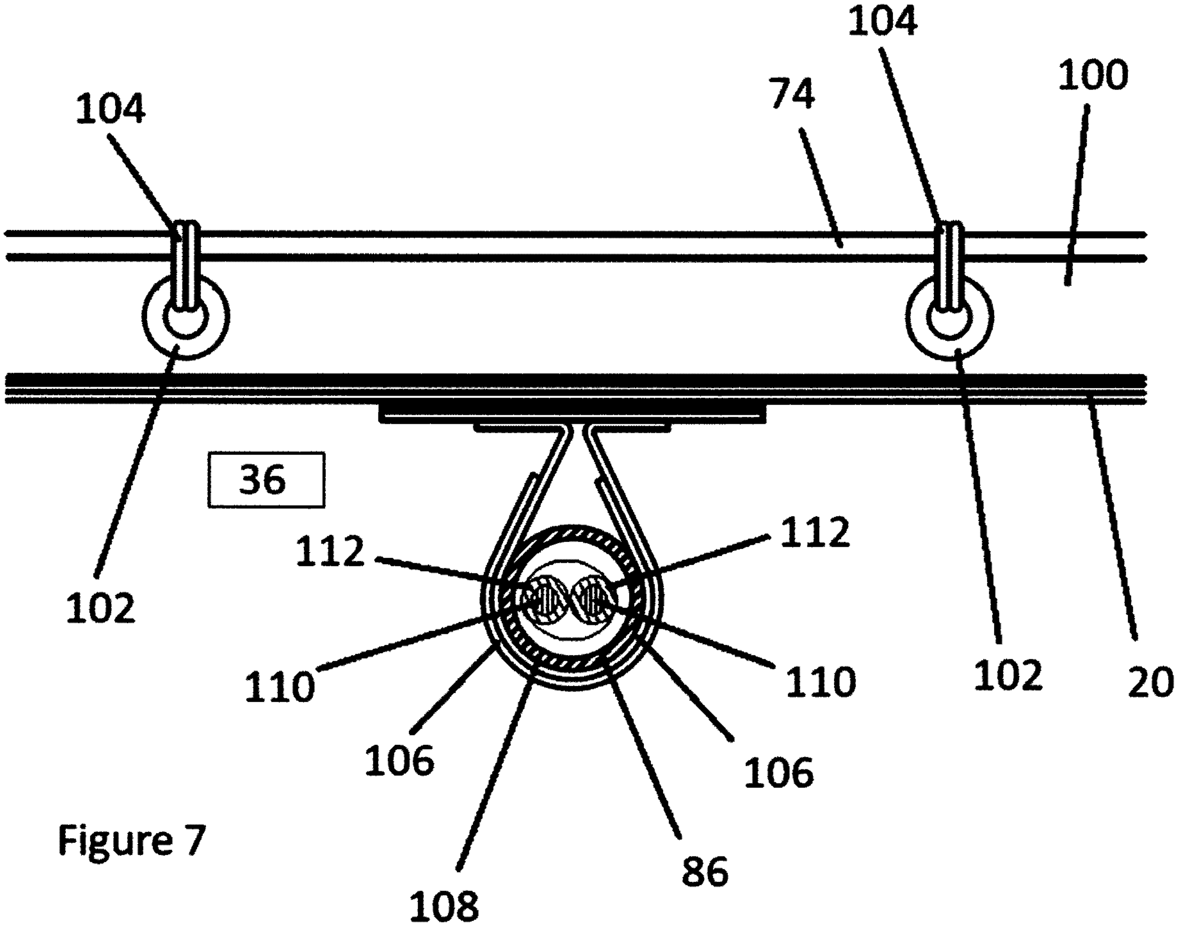
FIG. 7 is a cross-sectional view of the flexible cover of the spray booth shown in FIG. 1, showing a fire detection cable attached to the flexible cover.

Four grommet strips 100 extend outwardly from the flexible cover 20 for attaching the flexible cover 20 to the four intermediate frame members 74. As can be seen in FIG. 7, each grommet strip 100 carries a series of grommets 102, which are used to secure the flexible cover 20 to one of the intermediate frame members 74. The grommets 102 may, for example, carry a fastener 104, such as a rope or a metal clip, which attaches to the intermediate frame member 74.

Although not shown in the drawings, the flexible cover 20 optionally includes a window or windows that allow the internal compartment 36 of the collapsible enclosure 12 to be seen from the outside. The window or windows could be made from any suitable transparent material, such as transparent PVC.

When the collapsible frame 18 moves from the expanded configuration shown in FIG. 1 to the collapsed configuration shown in FIG. 2, the flexible cover 20 folds in on itself as shown in FIG. 2.

The fire suppression system 16 includes a control unit 84, a fire detection cable or cable assembly 86, a first electronic actuator cable 88, a second electronic actuator cable 90, a first fire extinguisher assembly 92, a second fire extinguisher assembly 94, a manual pull station 96, and an emergency indicator 98. The control unit 84 could be located at a different position than shown, such as on the other side. The pull station 96 and indicator 98 could also be located at different positions, such as mounted on the other side on the outside of the enclosure 12, on the side of the air filter unit 68 or the terminal frame member 72.

The control unit 84 controls the operation of the fire suppression system 16, and is preferably mounted to the filter unit 68 as shown schematically in FIG. 5. The control unit 84 may, for example, be the Strike™ control unit manufactured by Amerex. The fire detection cable or cable assembly 86 is connected to the control unit 84, and extends into the internal compartment 36 of the collapsible enclosure 12 through the filter unit attachment opening 60. More preferably, the cable 86 extends through a sealed fitting in the terminal frame member 72 steel cover. As can be seen in FIG. 3, the fire detection cable or cable assembly 86 extends upwardly from the filter unit attachment opening 60 to the top portion 54 of the second terminal frame member 72. The fire detection cable or cable assembly 86 runs along the top portion 54 of the second terminal frame member 72 to the top left corner of the second terminal frame member 72 where the top portion 54 meets the left side portion 56.

Optionally, the strike panel 84, the pull station 96, and the alarm 98 are mounted on the terminal frame member 72 on the opposite side of the man door 66. Optionally, the strike panel 84, the pull station 96, and the alarm 98 are mounted on the filter unit 68 on the same side as the man door 66.

Preferably, the fire detection cable 86 and actuator cable 88 will enter the enclosure 12 through the steel sheet on the terminal frame member 72 closest the strike panel 84. There will preferably be a plug assembly between the panel 84 and the detection cable 86 to facilitate moving while allowing the suppression system 16 to remain powered and active.

The fire detection cable or cable assembly 86 then extends across the collapsible enclosure 12 from the top left corner of the second terminal frame member 72 to the top left corner of the first terminal frame member 44 in a zig-zag path, including a first longitudinal portion from the top left corner of the second terminal frame member 72 to the top left corner of the rearward-most intermediate frame member 74; a first transverse portion from the top left corner of the rearward-most intermediate frame member 74 to the top right corner of the rearward-most intermediate frame member 74; a second longitudinal portion from the top right corner of the rearward-most intermediate frame member 74 to the top right corner of the second rearward-most intermediate frame member 74; a second transverse portion from the top right corner of the second rearward-most intermediate frame member 74 to the top left corner of the second rearward-most intermediate frame member 74; a third longitudinal portion from the top left corner of the second rearward-most intermediate frame member 74 to the top left corner of the second forward-most intermediate frame member 74; a third transverse portion from the top left corner of the second forward-most intermediate frame member 74 to the top right corner of the second forward-most intermediate frame member 74; a fourth longitudinal portion from the top right corner of the second forward-most intermediate frame member 74 to the top right corner of the forward-most intermediate frame member 74; a fourth transverse portion from the top right corner of the forward-most intermediate frame member 74 to the top left corner of the forward-most intermediate frame member 74; and a fifth longitudinal portion from the top left corner of the forward-most intermediate frame member 74 to the top left corner of the first terminal frame member 44.

The fire detection cable or cable assembly 86 is held in place in its zig zag path across the collapsible enclosure 12 by the flexible cover 20. As can be seen in FIG. 7, the flexible cover 20 has hook and loop fastener straps 106 that extend into the internal compartment 36 of the collapsible enclosure 12, and are looped around the fire detection cable or cable assembly 86 to hold the fire detection cable or cable assembly 86 in place inside the internal compartment 36. The fire detection cable or cable assembly 86 can be separated from the flexible cover 20 if needed by unfastening the hook and loop fastener straps 106, for example if the flexible cover 20 and/or the fire detection cable or cable assembly 86 need to be repaired or replaced.

Optionally, in other embodiments the cable 86 may not follow a zig-zag path. Optionally, the cables follow an alternate path, as in the fourth embodiment of the invention described in more detail below and shown in FIGS. 27A to 31B.

Figure 6:
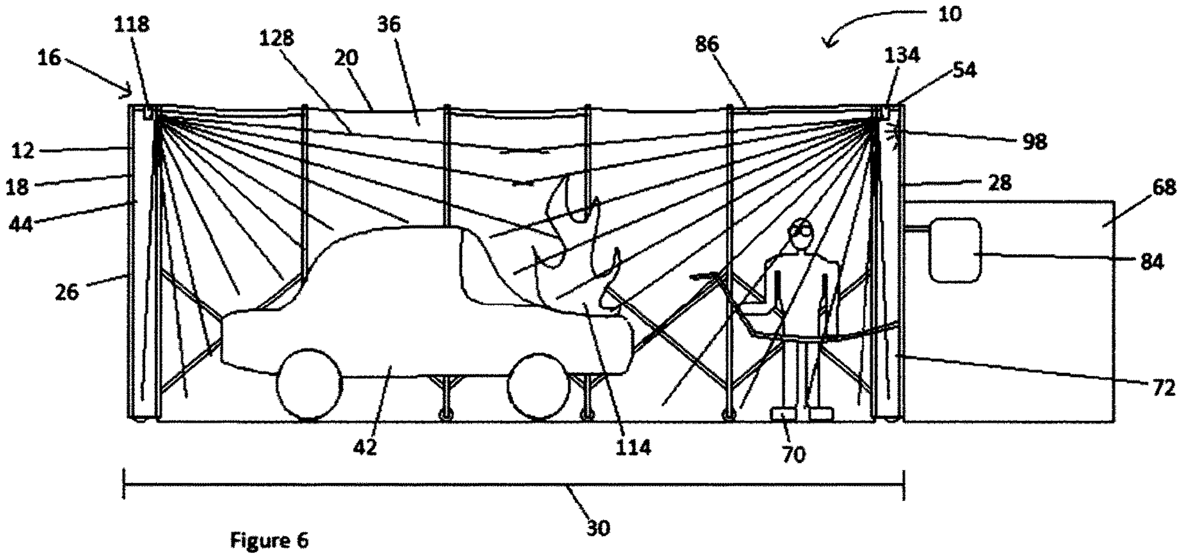
FIG. 6 is a schematic cross-sectional side view of the spray booth shown in FIG. 1, taken along line A-A' in FIG. 1, and showing a fire suppression system of the spray booth putting out a fire within the collapsible enclosure.
Figure 8:
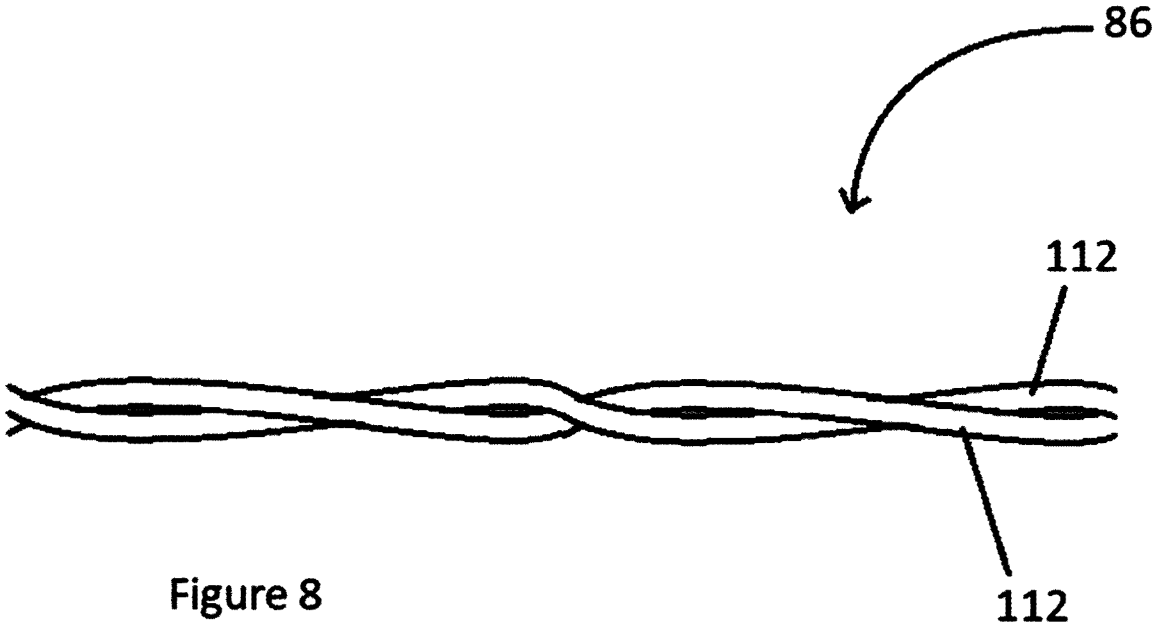
FIG. 8 is a side view of the fire detection cable shown in FIG. 7, with an external covering of the fire detection cable omitted.
Figure 9:
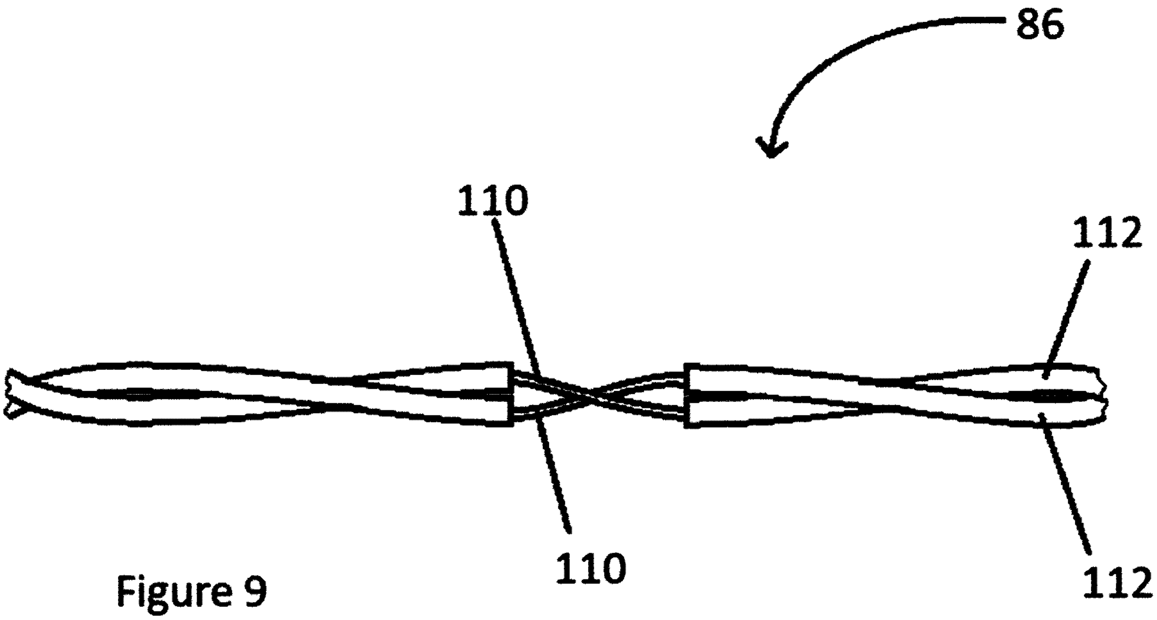
FIG. 9 is a side view of the fire detection cable shown in FIG. 8, showing the fire detection cable in an overheat condition.

As can be seen in the cross-sectional view shown in FIG. 7, the fire detection cable or cable assembly 86 has an external covering 108 that carries two tightly coiled conductive wires 110 that are each covered by a heat sensitive polymer coating 112. As shown in FIG. 8, under normal conditions the polymer coatings 112 separate the conductive wires 110 so that electrical current is unable to pass directly between the conductive wires 110. When the fire detection cable or cable assembly 86 is exposed to sufficient heat, for example from a fire 114 within the collapsible enclosure 12 as shown in FIG. 6, the polymer coatings 112 melt. This causes the conductive wires 110 to contact each other, as shown in FIG. 9, which allows electrical current to pass directly between the conductive wires 110. The resulting change in the electrical properties of the fire detection cable or cable assembly 86 is detected by the control unit 84 and indicates the presence of a fire 114 within the collapsible enclosure 12.

The fire detection cable or cable assembly 86 is optionally a single fire detection cable that is capable of detecting a fire along its entire length. Alternatively, the fire detection cable or cable assembly 86 could be an assembly that incorporates multiple individual fire detection cables. The fire detection cables in the assembly could be connected directly to each other, for example in series, or there could be extension cables or the like that are placed between the individual fire detection cables. The fire detection cable or cable assembly 86 may, for example, include a combination of one or more of the following: detection lead cables, detection extension cables, and linear heat detectors. Suitable detection lead cables, detection extension cables, and linear heat detectors are, for example, manufactured by Amerex.

As shown in FIG. 4, the fire detection cable or cable assembly 86 bends to allow the collapsible enclosure 12 to collapse from the expanded configuration to the collapsed configuration without removal or disassembly of the fire detection cable or cable assembly 86. Optionally, the fire detection cable or cable assembly 86 is flexible along its entire length. Alternatively, the fire detection cable or cable assembly 86 could be flexible only at certain areas along its length. For example, the first, second, third, fourth, and fifth longitudinal portions of the fire detection cable or cable assembly 86 could be made flexible to accommodate the change in the length of the collapsible enclosure 12 as it moves between the expanded configuration and the collapsed configuration, without the first, second, third, and/or fourth transverse portions necessarily being flexible as well.

The first electronic actuator cable 88 is connected to the control unit 84, and extends from the control unit 84 into the internal compartment 36 of the collapsible enclosure 12 through the filter unit attachment opening 60, or more preferably through the steel sheet of the terminal end structure 72 and sealed by a sealable fitting. The attachment is preferably made through use of a plug connect. Preferably, all cables and wires access the enclosure 12 through the steel panel on the terminal end structure 72 with sealed fittings. As can be seen in FIG. 3, the first electronic actuator cable 88 extends upwardly from the filter unit attachment opening 60 to the top portion 54 of the second terminal frame member 72. The first electronic actuator cable 88 then runs along the top portion 54 of the second terminal frame member 72 to the top right corner of the second terminal frame member 72 where the top portion 54 meets the right side portion 52. The first electronic actuator cable 88 then extends longitudinally across the collapsible enclosure 12 from the top right corner of the second terminal frame member 72 to the top right corner of the first terminal frame member 44. As can be seen in FIG. 10, the first electronic actuator cable 88 then extends down the right side portion 52 of the first terminal frame member 44 and connects to the first fire extinguisher assembly 92.

The first electronic actuator cable 88 is held in place adjacent to the flexible cover 20 by hook and loop fastener straps 106 similar to the straps 106 shown in FIG. 7. The first electronic actuator cable 88 is also flexible, which allows the first electronic actuator cable 88 to bend as shown in FIG. 4 when the collapsible enclosure 12 moves from the extended configuration shown in FIGS. 1 and 3 to the collapsed configuration shown in FIGS. 2 and 4. The first electronic actuator cable 88 delivers an electronic activation signal from the control unit 84 to the first fire extinguisher assembly 92 when a fire 114 is detected by the fire detection cable or cable assembly 86.

The first fire extinguisher assembly 92 is mounted to the metallic sheet 50 of the first terminal frame member 44, and includes a first agent cylinder 116, a first agent delivery hose or black pipe 120, a first nozzle or set of nozzles 118, a first nitrogen actuation cylinder 122, a first actuation hose 124, and a first electronic actuator 126. As shown in FIG. 10, the first agent cylinder 116, the first nitrogen actuation cylinder 112, and the first electronic actuator 126 are mounted to the right side portion 52 of the first terminal frame member 44. The first nozzle or set of nozzles 118 is mounted to the top portion 54 of the first terminal frame member 44, as shown in FIG. 5. The first electronic actuator 126 may, for example, be the Strike Releasing Module™ manufactured by Amerex. The first nozzle or set of nozzles 118 may, for example, include the Total Flood, Perimeter (TFP) nozzle P/N 17809 manufactured by Amerex. Optionally, the first electronic actuator 126 may be covered by an Amerex Strike Release Module Cover (P/N 26607).

The first agent cylinder 116 contains a fire extinguishing agent 128, which may for example include a dry chemical such as monoammonium phosphate. The first agent cylinder 116 is connected to the first nozzle or set of nozzles 118 by the first agent delivery hose or black pipe 120. When the first agent cylinder 116 is activated, the fire extinguishing agent 128 is delivered to the first nozzle or set of nozzles 118 by the first agent delivery hose or black pipe 120.

The first nozzle or set of nozzles 118 is configured to discharge the fire extinguishing agent 128 in a multidirectional spray that encompasses at least half of an internal volume of the internal compartment 36 and extends in the longitudinal direction towards the second end 28 of the spray booth 10 for at least half of the extended length 30 of the collapsible frame 18, as shown in FIG. 6. The nozzle preferably provides a focused forward spray, and uses the back wall to focus spray down and forward.

As shown in FIG. 10, the first electronic actuator cable 88 is connected to the first electronic actuator 126, and the first electronic actuator 126 is connected to the first nitrogen actuation cylinder 122. The first nitrogen actuation cylinder 122 is furthermore connected to the first agent cylinder 116 by the first actuation hose 124. Upon receipt of the electronic activation signal from the first electronic actuator cable 88, the first electronic actuator 126 activates the first nitrogen actuation cylinder 122. This causes the first nitrogen actuation cylinder 122 to release pressurized nitrogen into the first actuation hose 124, which delivers the pressurized nitrogen to the first agent cylinder 116 to activate the first agent cylinder 116. The pressurized nitrogen acts as a propellant, delivering the fire extinguishing agent 128 from the first agent cylinder 116 to the first nozzle or set of nozzles 118 for discharge into the internal compartment 36. The first electronic actuator 126 optionally comprises an Amerex Strike Release Module (P/N 26607) and Linear Actuator (P/N 24448). The first nitrogen actuation cylinder 122 optionally comprises an Amerex 10 square inch nitrogen cylinder (P/N 12856). The first agent cylinder 116 optionally comprises an Amerex pneumatic control head (P/N 10147) and industrial 45 lb cylinder (P/N 16208).

The second fire extinguisher assembly 94 is identical to the first fire extinguisher assembly 92, but is mounted on the metallic sheet 50 of the second terminal frame member 72 rather than the first terminal frame member 44. The second fire extinguisher assembly includes a second agent cylinder 130, a second agent delivery hose 132, a second nozzle or set of nozzles 134, a second nitrogen actuation cylinder 136, a second actuation hose or black pipe 138, and a second electronic actuator 140. As shown in FIG. 11, the second agent cylinder 130, the second nitrogen actuation cylinder 136, and the second electronic actuator 140 are mounted to the right side portion 52 of the second terminal frame member 72. The second nozzle or set of nozzles 134 is mounted to the top portion 54 of the second terminal frame member 72, as shown in FIG. 5.

As shown in FIG. 11, the second electronic actuator cable 90 is connected to the second electronic actuator 140. The second electronic actuator cable 90 is connected to the control unit 84, and delivers an electronic activation signal from the control unit 84 to the second electronic actuator 140 when a fire 114 is detected by the fire detection cable or cable assembly 86. Upon receipt of the electronic activation signal, the second electronic actuator 140 activates the second nitrogen actuation cylinder 136, which then delivers pressurized nitrogen to the second agent cylinder 130 via the second actuator hose 138. The pressurize nitrogen acts as a propellant, delivering the fire extinguishing agent 128 from the second agent cylinder 130 to the second nozzle or set of nozzles 134 via the second agent delivery hose or black pipe 132.

The fire extinguishing agent 128 is discharged from the second nozzle or set of nozzles 134 in a multidirectional spray that encompasses at least half of the internal volume of the internal compartment 36 and extends in the longitudinal direction towards the first end 26 of the spray booth 10 for at least half of the extended length 30 of the collapsible frame 18, as shown in FIG. 6. The nozzle 134 preferably provides a focused down and forward spray. Together, the first nozzle or set of nozzles 118 and the second nozzle or set of nozzles 134 therefore fill the entire internal volume of the internal compartment 36 with the fire extinguishing agent 128 upon detection of a fire 114 within the internal compartment 36.

As can be seen in FIG. 3, the manual pull station 96 is shown mounted on the filter unit attachment end 24 of the collapsible enclosure 12 adjacent to the rear door 66. The manual pull station 96 can be activated by a worker 70 inside the internal compartment 36 pulling the manual pull station 96, for example if the worker 70 observes a fire 114 inside the internal compartment 36. The manual pull station 96 is connected to the control unit 84, and sends a signal to the control unit 84 when the manual pull station 96 is activated. The control unit 84 then sends an activation signal to the first fire extinguisher assembly 92 and the second fire extinguisher assembly 94 to extinguish the fire 114 in the manner as described above.

More preferably, the manual pull station 96 is over three feet back from the man door 66. The manual pull station 96 may, in some embodiments, not be listed for hazardous location use and must be more than 3 feet from the man door 66 outside the enclosure 12. The warning alarm 98 may also fall into that situation and be located higher on the filter unit 68 above the pull station 96.

The emergency indicator 98 is shown in FIGS. 5 and 6 as being mounted on the filter unit attachment end 24 of the collapsible enclosure 12. The emergency indicator 98 is connected to the control unit 84, and is configured to provide an emergency signal to workers 70 in the area when a fire 114 has been detected or when the manual pull station 96 has been activated. The emergency indicator 98 may, for example, produce a bright, flashing light, a loud siren, or preferably both. Although only one emergency indicator 98 is shown in the drawings, there could be multiple emergency indicators 98 at different locations. For example, one emergency indicator 98 could be located inside the internal compartment 36, and another emergency indicator 98 could be located outside the internal compartment 36, such as on the filter unit 68.

Figure 13:
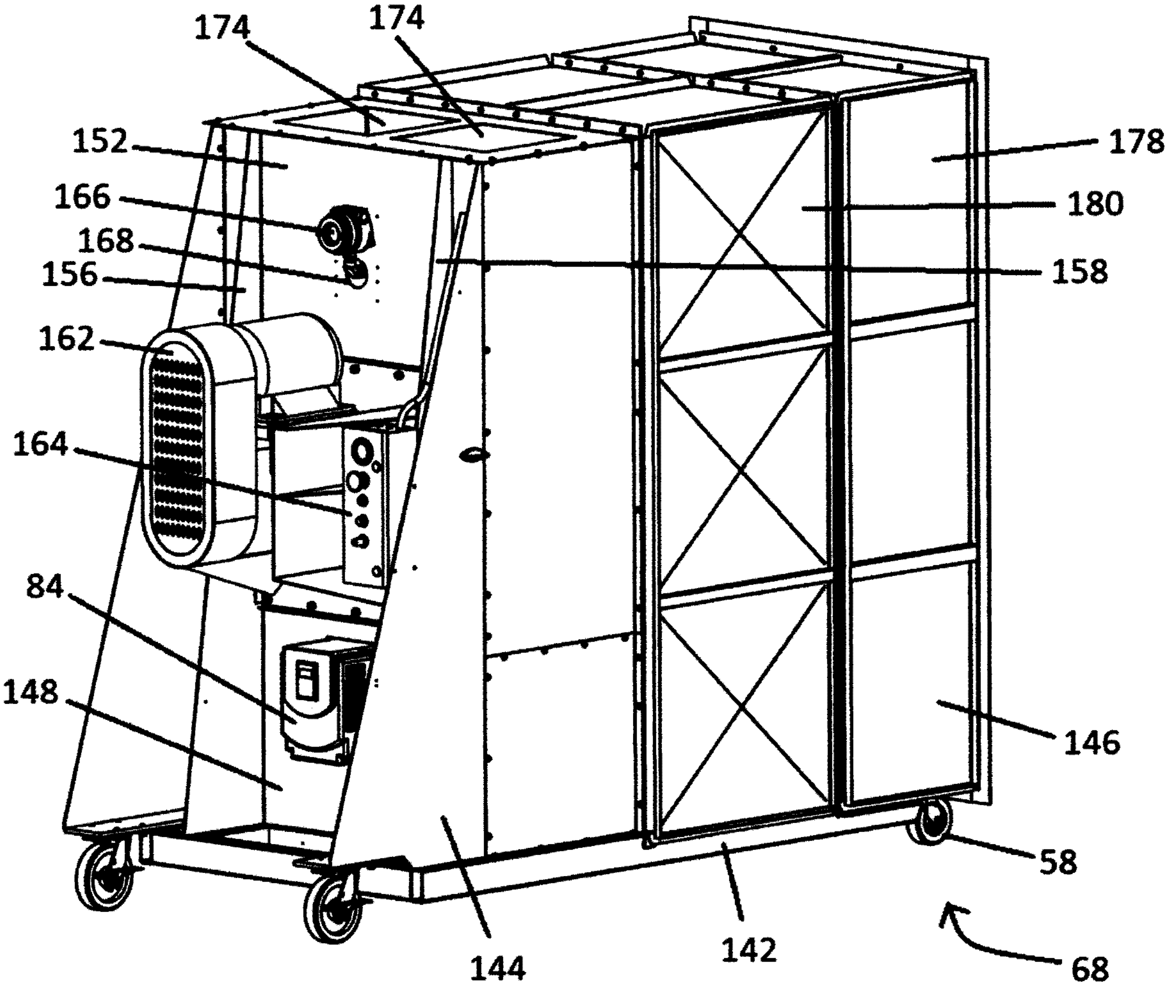
FIG. 13 is a rear perspective view of a filter unit of the spray booth shown in FIG. 1.

The filter unit 68, which is shown schematically in FIGS. 1 to 6, is shown in more detail in FIGS. 13 to 17. Referring to FIG. 13, the filter unit 68 includes a horizontal base 142, a fan support assembly 144, and a filter assembly 146. The horizontal base 142 carries the fan support assembly 144 and the filter assembly 146, and has a wheel 58 at each of its four corners to allow the filer unit 68 to be rolled over a surface such as the floor of a garage.

Figure 15:
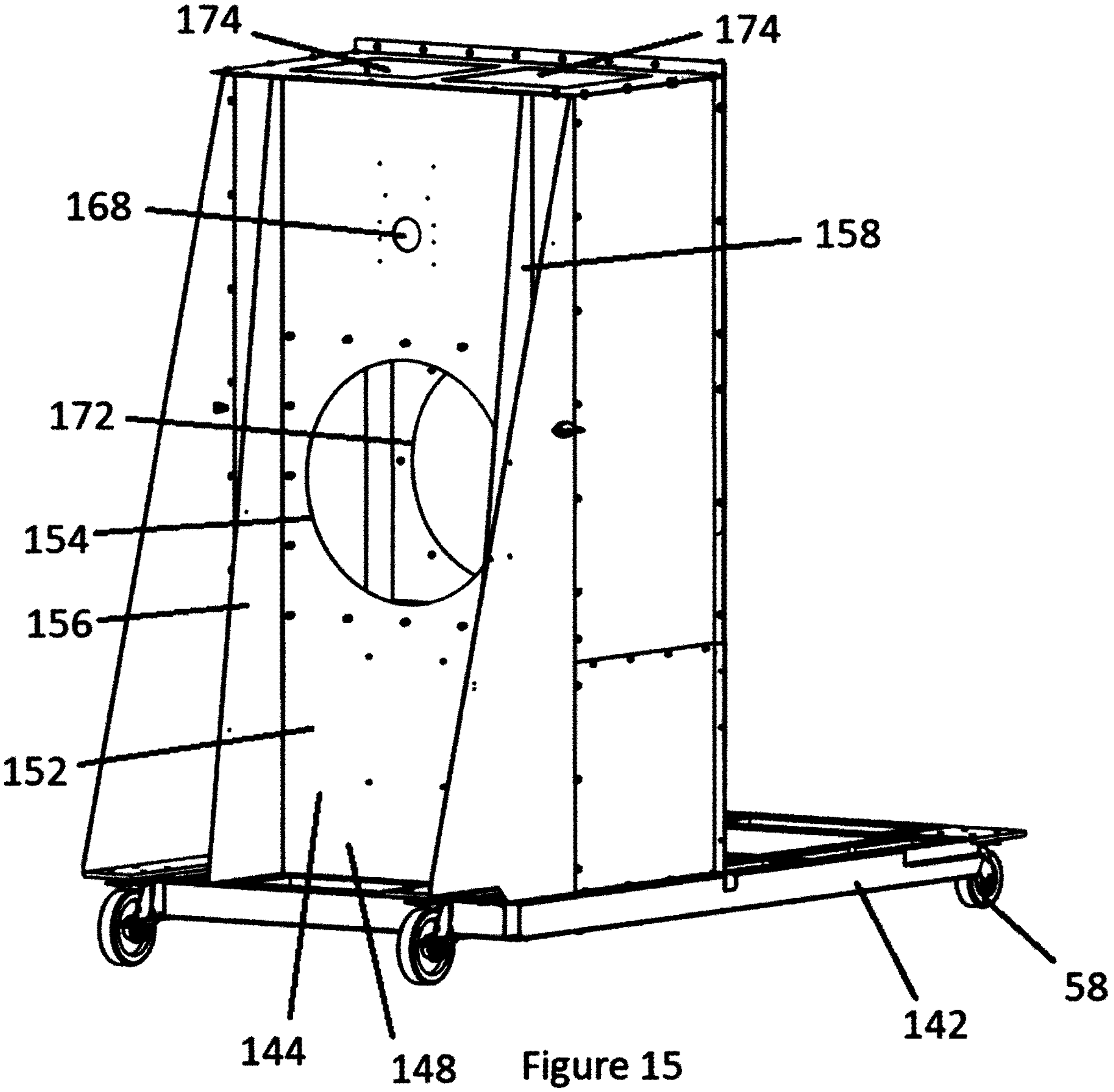
FIG. 15 is a rear perspective view of a horizontal base and a fan support assembly of the filter unit shown in FIG. 13.

The fan support assembly 144 includes a fan support member 148 and a funnel member 150. As can be seen in FIG. 15, the fan support member 148 has a vertical plate 152 with a circular central opening 154. A right side vertical support rib 156 and a left side vertical support rib 158 extend from a right side and a left side of the vertical plate 152, respectively. When the filter unit 68 is attached to the collapsible enclosure 12, the right side vertical support rib 156 and the left side vertical support rib 158 extend away from the filter unit attachment end 24 of the collapsible enclosure 12.

Figure 14:
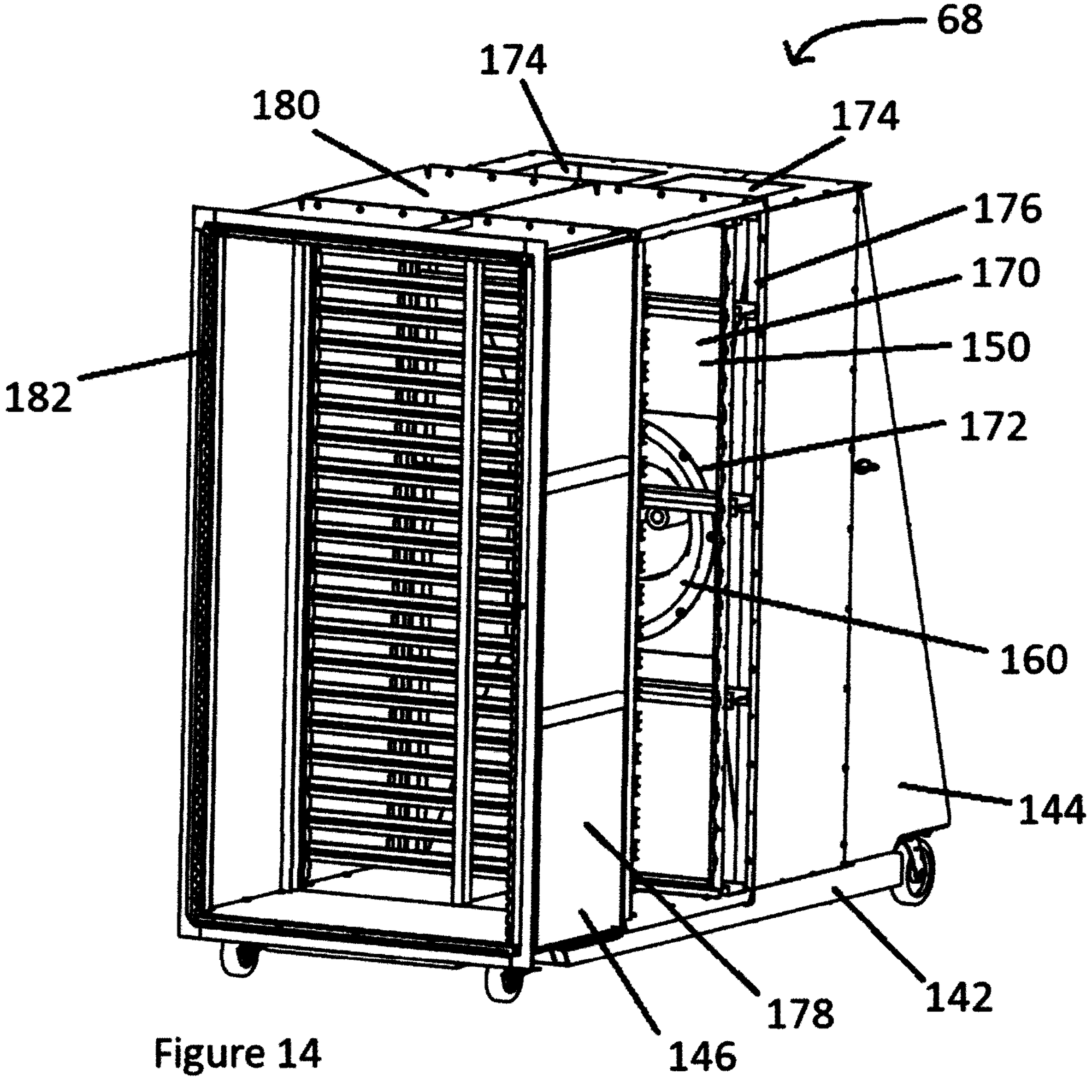
FIG. 14 is a front perspective view of the filter unit shown in FIG. 13.

As shown in FIGS. 13 and 14, the fan support member 148 carries a fan 160, a motor 162, a drive unit 164, the control unit 84, and a sensor device 166. The fan 160 is best shown in FIG. 14, and is carried by the circular central opening 154 of the vertical plate 152. The motor 162 provides power to the fan 160, and is controlled by the drive unit 164. The sensor device 166 extends through an upper opening 168 in the vertical plate 152 and is configured to sense contaminants in the air expelled by the fan 160. The sensor device 166 may, for example, include a volatile organic compound monitor and/or a lower explosion level monitor. The fan 160 may, for example, be the BEPL™ fan manufactured by Twin City Fan. The sensor device 166 may, for example, be the PI-700™ VOC gas sensor manufactured by Detcon, Inc. The drive unit 164 may for example be a Teco Westinghouse™ variable frequency drive. The right side vertical support rib 156 and the left side vertical support rib 158 help to dissipate vibrations from the motor 162 and the fan 160. Although the control unit 84 is shown in FIG. 13 as mounted to the back of the filter unit 68, in other preferred embodiments the control unit 84 could be mounted to the side of the filter unit 68, as in the fourth embodiment of the invention described below and shown in FIGS. 27A to 31B. Mounting the control unit 84 on the side of the filter unit 68 preferably allows the control unit 84 to be enlarged if necessary to, for example, support extra hardware inside.

Figure 16:
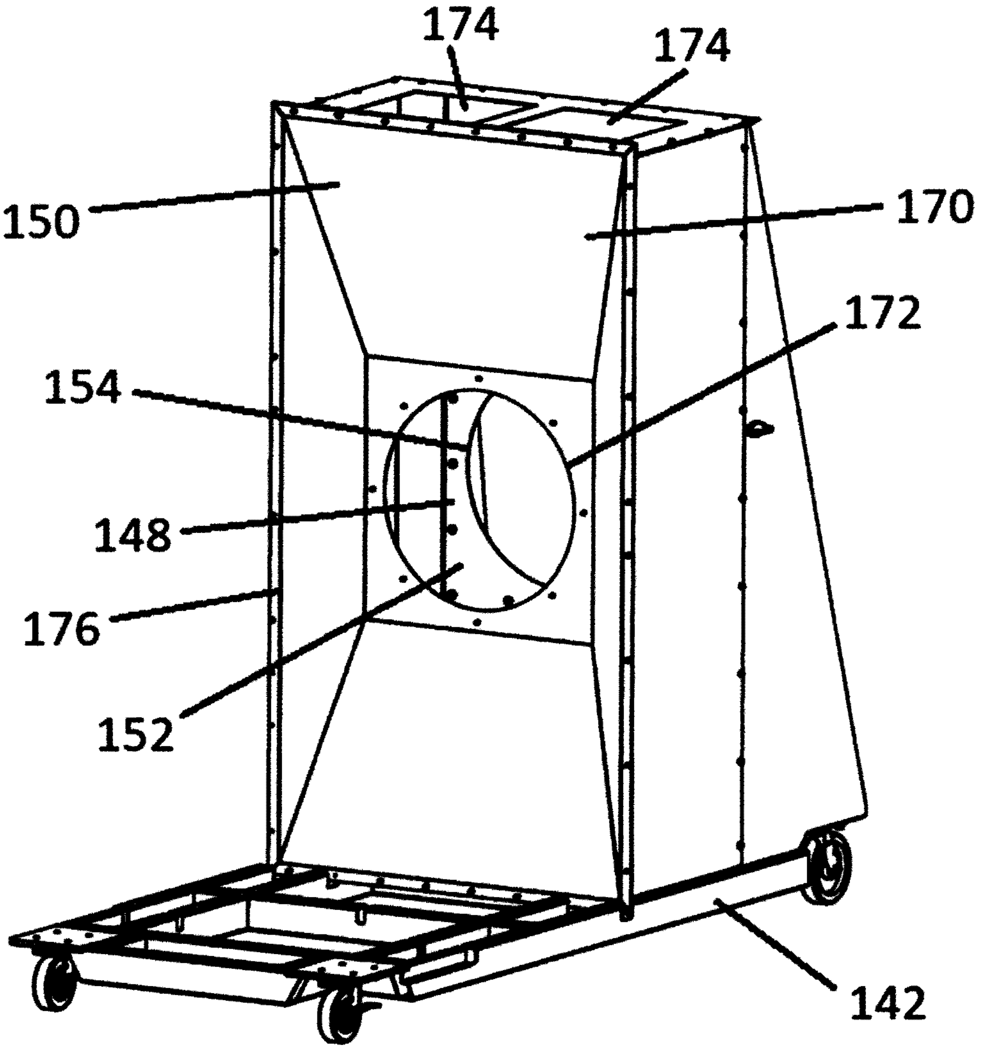
FIG. 16 is a front perspective view of the horizontal base and the fan support assembly shown in FIG. 15.
Figure 17:
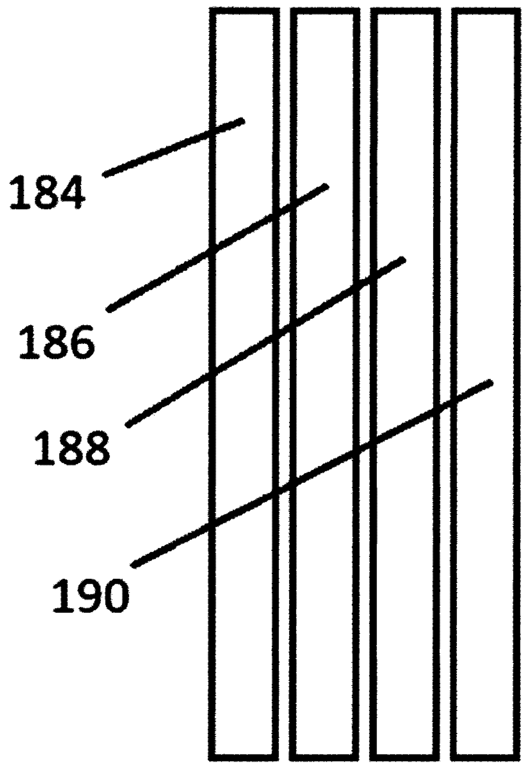
FIG. 17 is a schematic side view of four filters to be carried by the filter unit shown in FIG. 13.

As best shown in FIG. 16, the funnel member 150 is mounted beside the fan support member 148, and has a funnel shaped body 170 with a circular first open end 172 and a larger, rectangular second open end 176. The circular first open end 172 is aligned with and spaced longitudinally from the circular central opening 154 of the vertical plate 152. The fan 160 is mounted between the circular first open end 172 of the funnel member 150 and the circular central opening 154 of the vertical plate 152, with an air intake side of the fan 160 facing towards the circular first open end 172 of the funnel member 150. The fan 160 is configured to draw air in through the circular first open end 172 of the funnel member 150, and to expel the air upwardly out of the filter unit 68 through an exhaust air pathway 174. The sensor device 166 extends into the exhaust air pathway 174 for sensing contaminants in the exhausted air.

As shown in FIG. 13, the filter assembly 146 includes a first and second stage filter box 178 and a third and fourth stage filter box 180. As shown in FIG. 14, the first and second stage filter box 178 has a forwardly facing attachment border 182 formed from a hook and loop fastener such as Velcro™ for attaching the filter unit 68 to the central filter unit attachment opening 60 in the back cover 62 of the collapsible enclosure 12. The third and fourth stage filter box 180 is positioned between the first and second stage filter box 178 and the second open end 176 of the funnel member 150. In FIG. 14, the side walls of the third and fourth stage filter box 180 are omitted so that the fan 160 is visible.

The first and second stage filter box 178 carries a first stage filter 184 and a second stage filter 186, and the third and fourth stage filter box 180 carries a third stage filter 188 and a fourth stage filter 190. The first stage filter 184, the second stage filter 186, the third stage filter 188, and the fourth stage filter 190 are shown schematically in FIG. 17, and are omitted from FIG. 14 so that the structure of the first and second stage filter box 178 and the third and fourth stage filter box 180 can be seen.

In one preferred embodiment of the invention, the first stage filter 184 comprises an overspray arrestor, the second stage filter 186 comprises a MERV 13 multi-pocket filter, the third stage filter 188 comprises a carbon filter, and the fourth stage filter 190 comprises a MERV 8 pleated panel filter. The first stage filter 184 may for example be the Paint Pockets™ overspray arrestor manufactured by the Paint Pockets Company. The second stage filter 186 may for example be the Hi-Flo™ MERV 13 filter manufactured by Camfil. The third stage filter 188 may for example be the CamCarb PG™ panels manufactured by Camfil. The fourth stage filter 190 may for example be the high-capacity MERV 8 filter Farr 30/30™ manufactured by Camfil.

One preferred manner of operating the spray booth 10 will now be described with reference to FIGS. 1 to 17. To use the spray booth 10, a worker 70 first drives a vehicle 42 into the internal compartment 36 of the collapsible enclosure 12 via the vehicle entrance doors 34. The worker 70 then closes the vehicle entrance doors 34 and exits the collapsible enclosure 12 via the rear door 66. The worker 70 then turns on the drive unit 164. The drive unit 164 is preferably connected to and provides power to various components of the spray booth 10, including the control unit 84, the fan 160, and the sensor device 166, as shown schematically in FIG. 12. The drive unit 164 also provides power to a spray paint apparatus 192 for spray painting the vehicle 42, as shown in FIG. 5.

On startup, the drive unit 164 preferably performs a diagnostic routine to confirm that the fire suppression system 16 and the sensor device 166 are operational. The drive unit 164 may, for example, communicate with the control unit 84 to ensure that the control unit 84 is properly connected to the fire detection cable or cable assembly 86, the first fire extinguisher assembly 92, and the second fire extinguisher assembly 94, and that all of the components of the fire suppression system 16 are functioning normally. The drive unit 164 preferably only provides power to the fan 160 and to the spray paint apparatus 192 after the diagnostic routine is complete and no errors or malfunctions have been detected. This ensures that the spray booth 10 cannot be used unless the fire suppression system 16 and the sensor device 166 are connected and operational.

Once the fan 160 is turned on, it begins drawing air from the internal compartment 36 of the collapsible enclosure 12 through the filter unit attachment opening 60 and into the filter unit 68. The air passes through the first stage filter 184, and then the second stage filter 186, and then the third stage filter 188, and then the fourth stage filter 190, and then through the funnel member 150 and into the fan 160. The air is then expelled from the filter unit 68 through the exhaust air pathway 174.

With the fan 160 turned on and drawing air from the collapsible enclosure 12, the worker 70 can re-enter the collapsible enclosure 12 and begin spray painting the vehicle 42 using the spray paint apparatus 192, as shown in FIG. 5. As the worker 70 spray paints the vehicle 42, the air within the internal compartment 36 becomes contaminated by the particles and chemicals released from the spray paint apparatus 192. The contaminated air is drawn by the fan 160 through the filter unit 68, which filters the contaminants out of the air using the first stage filter 184, the second stage filter 186, the third stage filter 188, and the fourth stage filter 190. The filtered air is then exhausted from the filter unit 68 through the exhaust air pathway 174.

As the filtered air passes through the exhaust air pathway 174, the sensor device 166 tests the air for contaminants. If the sensor device 166 detects an unsafe type and/or quantity of contaminants in the air, the sensor device 166 preferably sends a deactivation signal to the drive unit 164, which causes the drive unit 164 to turn off power to the spray paint apparatus 192. The sensor device 166 also preferably sets off an alarm to warn workers 70 in the area that there is an unsafe type and/or quantity of contaminants in the air exhausted from the filter unit 68.

In the event of a fire 114 within the internal compartment 36 of the collapsible enclosure 12, the fire detection cable and or cable assembly 86 detects the fire 114 in the manner as described above. Upon detection of a fire 114, the control unit 84 sends an activation signal to the first fire extinguisher assembly 92 and the second fire extinguisher assembly 94, which causes the first fire extinguisher assembly 92 and the second fire extinguisher assembly 94 to flood the internal compartment 36 with the fire extinguishing agent 128 to put out the fire 114 in the manner as described above. Alternatively, the control unit 84 may be triggered to activate the first fire extinguisher assembly 92 and the second fire extinguisher assembly 94 by the worker 70 activating the manual pull station 96. The emergency indicator 98 preferably provides a visual and/or audio warning to workers 70 in and around the spray booth 10 when a fire 114 is detected, so that the workers 70 can leave the area as quickly as possible.

If there is no fire 114 in the collapsible enclosure 12, the worker 70 can continue spray painting the vehicle 42 until the paint job is complete. The vehicle 42 can then be driven out of the collapsible enclosure 12 through the vehicle entrance doors 34, and the drive unit 164 can be powered down. The spray booth 10 can optionally be left in the same location, and used to spray paint additional vehicles 42 in the manner as described above, with the drive unit 164 performing the diagnostic routine each time the drive unit 164 is powered on.

The spray booth 10 can also be moved to another location by collapsing the collapsible enclosure 12 from the expanded configuration shown in FIG. 1 to the collapsed configuration shown in FIG. 2, and then transporting the collapsed spray booth 10 to the new location. The spray booth 10 can be more easily transported when in the collapsed configuration because of its reduced size as compared to the expanded configuration. Once the spray booth 10 has arrived at the new location, the collapsible enclosure 12 can be moved back to the extended configuration. The spray booth 10 can then be used for spray painting vehicles 42 at the new location, in the manner as described above.

Advantageously, the fire suppression system 16 does not need to be disassembled or removed from the spray booth 10 when the collapsible enclosure 12 is collapsed. As can be seen in FIG. 4, the fire detection cable or cable assembly 86 and the first electronic actuator cable 88 both bend to allow the collapsible enclosure 12 to move from the expanded configuration to the collapsed configuration.

The first fire extinguisher assembly 92 and the second fire extinguisher assembly 94 also do not need to be disassembled or removed when the collapsible enclosure 12 is collapsed. This is because the first fire extinguisher assembly 92 and the second fire extinguisher assembly 94 are mounted to the first terminal frame member 44 and the second terminal frame member 72, respectively, and the width of the first terminal frame member 44 and the second terminal frame member 72 in the longitudinal direction remains unchanged when the collapsible enclosure 12 moves between the expanded configuration and the collapsed configuration. The width of the first terminal frame member 44 and the second terminal frame member 72 may, for example, be about 12 inches.

Mounting the first fire extinguisher assembly 92 and the second fire extinguisher assembly 94 to the first terminal frame member 44 and the second terminal frame member 72, respectively, also advantageously allows the first fire extinguisher assembly 92 and the second fire extinguisher assembly 94 to be mounted within the collapsible enclosure 12 without piercing the flexible cover 20. This preferably helps to prevent contaminated air from escaping the internal compartment 36, for example through holes in the flexible cover 20 if the flexible cover 20 was pierced.

Figure 18:
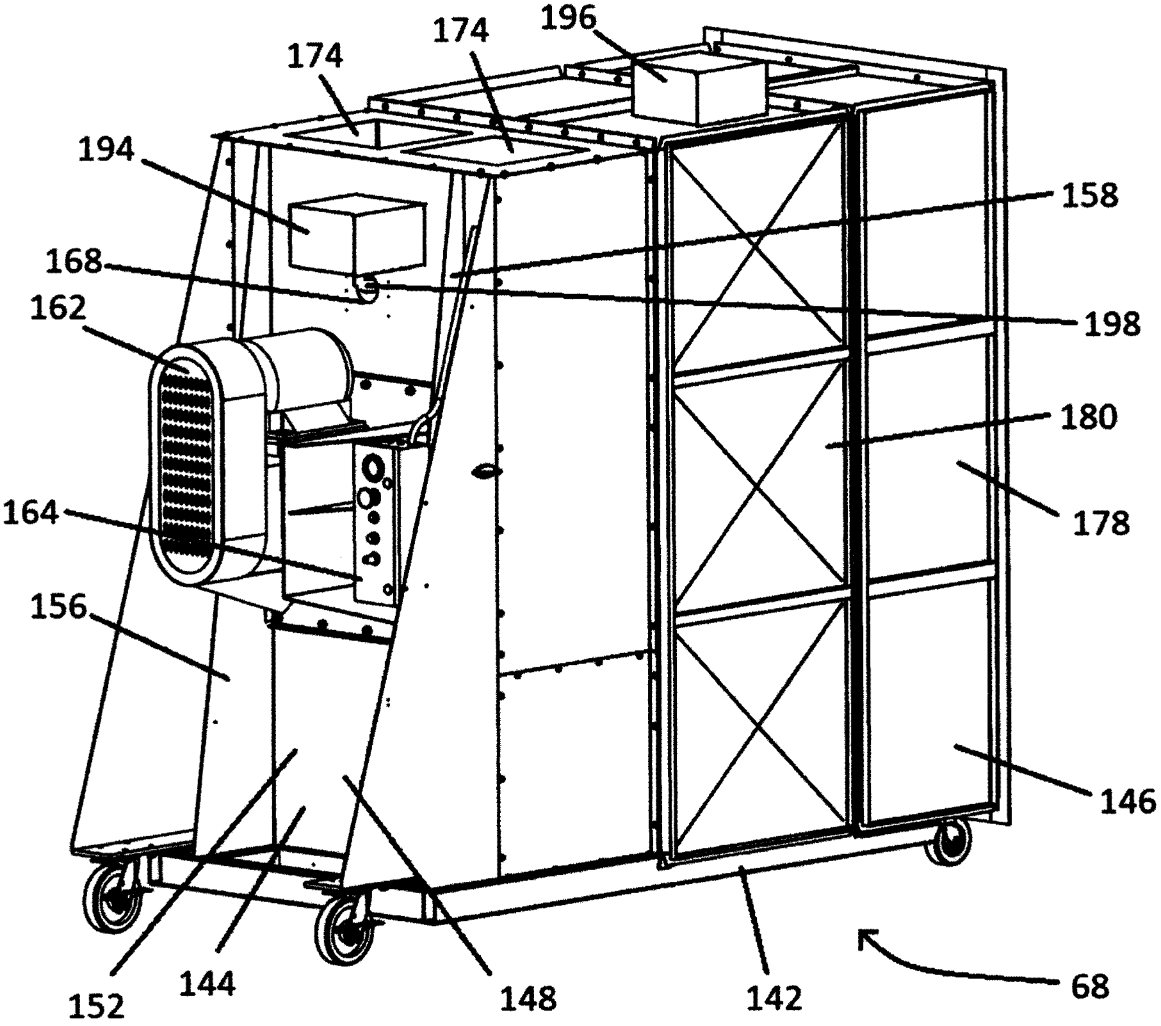
FIG. 18 is a rear perspective view of a filter unit in accordance with a second embodiment of the present invention.
Figure 19:
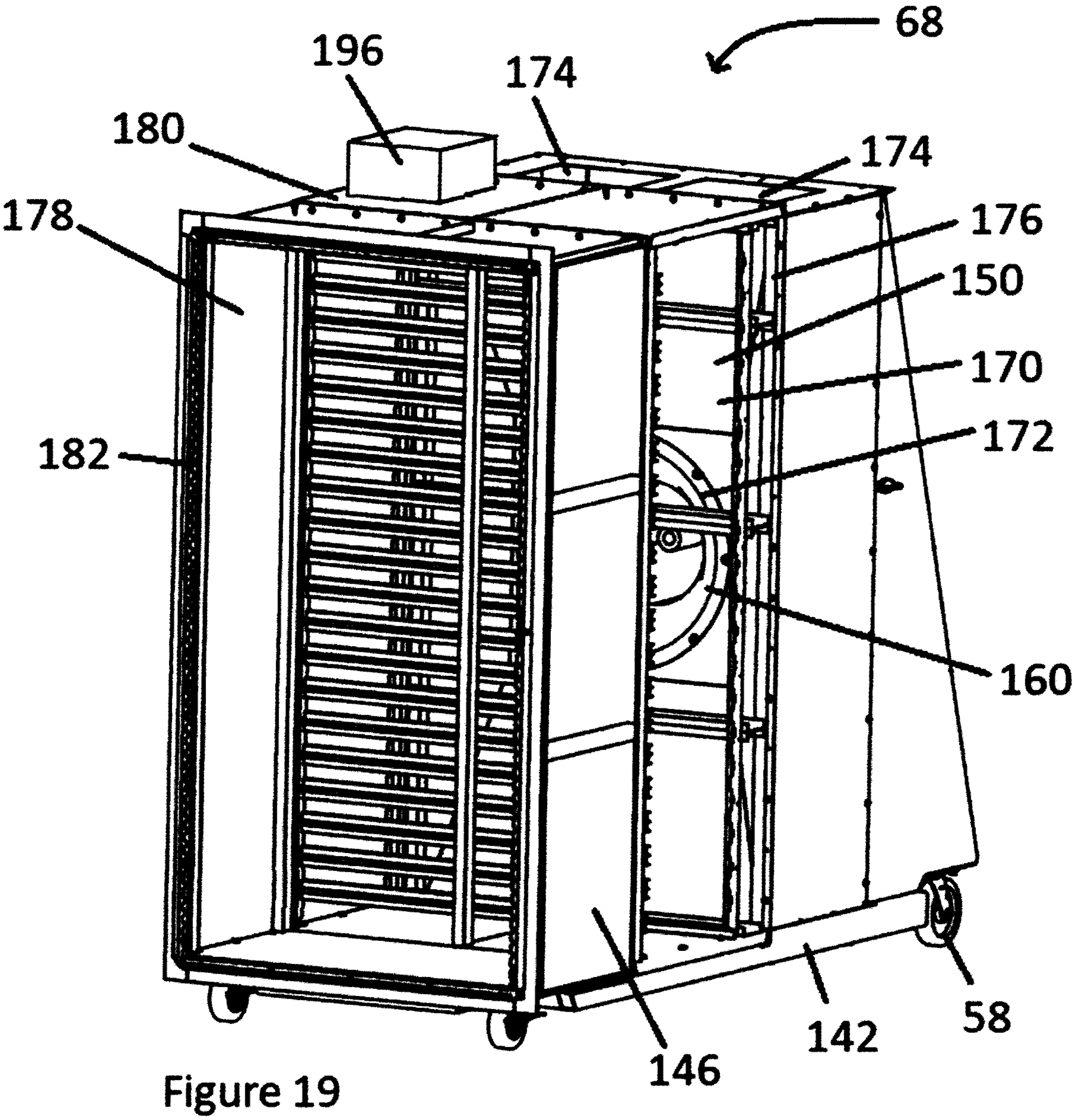
FIG. 19 is a front perspective view of the filter unit shown in FIG. 18.

Reference is now made to FIGS. 18 and 19, which show a filter unit 68 in accordance with a second embodiment of the present invention. Like numerals are used to denote like components.

The applicant has advantageously appreciated that the filter unit 68 used in the mobile automotive spray booth 10 shown in FIGS. 1 to 17 can also be adapted for other purposes. For example, the filter unit 68 could be adapted for use as a standalone filter unit 68 that can be placed in a facility requiring air filtration, without the filter unit 68 being attached to a collapsible enclosure 12. The filter unit 68 could, for example, be placed in a building where agricultural products are grown, such as a greenhouse or a hydroponic or aquaponics facility. The filter unit 68 could then be used to filter the air in the agricultural facility, to for example remove mold and odors from the air.

The first stage filter 184, the second stage filter 186, the third stage filter 188, and the fourth stage filter 190 are preferably selected to obtain the desired degree of filtration in the facility where the filter unit 68 is installed. For example, in one preferred embodiment in which the filter unit 68 is used for filtering air in an agricultural facility, the first stage filter 184 comprises an overspray arrestor-type filter; the second stage filter 186 comprises a HEPA filter; the third stage filter 188 comprises a carbon filter; and the fourth stage filter 190 comprises a MERV 9 pleated filter. The HEPA filter preferably removes mold spores from the air and the carbon filter preferably eliminates unwanted odors. The first stage filter 184 may for example be the Paint Pockets™ overspray arrestor manufactured by the Paint Pockets Company. The second stage filter 186 may for example be the Filtra 2000™ manufactured by Camfil Farr. The third stage filter 188 may for example be the CamCarb PG™ panels manufactured by Camfil. The fourth stage filter 190 may for example be the 30/30 Dual 9™ high-capacity MERV 9/9A pleated panel filter manufactured by Camfil.

The filter unit 68 shown in FIGS. 18 and 19 has been further adapted for use in an agricultural facility by incorporating two ozone generators 194 and 196. The first ozone generator 194 is attached to the vertical plate 152, and has a pipe 198 that extends through the upper opening 168 for injecting ozone into the exhaust air pathway 174. The second ozone generator 196 is shown mounted on top of the third and fourth stage filter box 180 for injecting ozone into the carbon filter. In other preferred embodiments, the second ozone generator 196 may be mounted on the vertical plate 152 or back wall of the filter unit 68, similarly to the first ozone generator 194. The ozone generators 194 and 196 may for example be the Sterling XT Pro Cannon™ manufactured by Oxyzone Enterprises, LLC.

The filter unit 68 preferably has at least three different modes of operation that can be selected by an operator. In a first mode of operation, the ozone generators 194 and 196 are turned off, and the fan 160 is used to draw air from the facility through the first stage filter 184, the second stage filter 186, the third stage filter 188, and the fourth stage filter 190, and then expel the filtered air out through the exhaust air pathway 174.

In a second mode of operation, the fan 160 and the first ozone generator 194 are both turned off, and the second ozone generator 196 is used to inject ozone into the carbon filter for a short period of time. The second ozone generator 196 is then turned off, and the ozone is given time to convert into oxygen. After a preselected interval of time has passed, such as for example 45 minutes, the fan 160 is turned on and the filter unit 68 is used as in the first mode of operation described above. Periodically flooding the carbon filter with ozone preferably helps to extend the useful life of the carbon filter.

In a third mode of operation, the fan 160 and the first ozone generator 194 are both turned on, and the first ozone generator 194 is used to inject ozone into the filtered air as it is being exhausted through the exhaust air pathway 174. Injecting ozone into the filtered air preferably helps to eliminate unwanted odors and/or kill mold.

Optionally, a single ozone generator 194 could be used to generate the ozone for both the second and the third modes of operation.

Preferably, the filter unit 68 carries a device that monitors the concentration of ozone in the air, and automatically turns off the ozone generators 194, 196 if the ozone concentration exceeds a predetermined threshold.

Optionally, the unit 68 incorporates one or two or more oxygen generators, and the one ozone generator sized accordingly for the volume needed. The oxygen generators optionally go in place of the drive as it is powered direct and the ozone generator optionally replaces the VOC/LEL monitor connected to two pipes located between the second and third stage filters fitted with holes to evenly distribute the ozone over the filter surface.

Ozone options include the following:

Carbon clean—10 gram ozone generator with control panel to time ozone injection to carbon. The unit would shut down inject low level ozone through pre-installed tubes then stop injection and restart the fans 45 minutes later after the ozone has converted to oxygen.

Odor control—60 gram ozone generator or larger depending on size of the unit. The high volume ozone is injected into the exhaust stream (for exterior exhaust only) and in conjunction with the carbon will eliminate extreme odor situations.

Ozone gas monitoring—is available for situations where precise control of ozone use is required. Remote monitors linked to control panel can help guarantee parameters are met.

It is to be appreciated that the invention is not limited to the particular constructions of the spray booth 10, the collapsible enclosure 12, and the filter unit 68 shown in the drawings. Rather, any suitable construction could be used. For example, the collapsible enclosure 12 could have different dimensions than those shown in the drawings, could be made from different materials, and could have a greater number or a smaller number of intermediate frame members 74. The collapsible enclosure 12 could also use a different mechanism for expanding and collapsing than the one shown in the drawings. The filter unit 68 could also have any suitable construction, and could for example have a different shape, a different arrangement of components, a different number of filters, and/or different types of filters than those shown and described above.

The fire detection cable or cable assembly 86 could be supported in a different manner from that shown in the drawings, and could for example follow a different path across the collapsible enclosure 12 than the one shown in the drawings. The fire suppression system 16 could also have a greater number or a smaller number of fire extinguisher assemblies 92, 94 than is shown in the drawings and described above. The fire extinguisher assemblies 92, 94 could also have different components than those shown in the drawings. For example, agent cylinders 116, 130 could be selected that contain their own propellant, such that the nitrogen actuation cylinders 122, 136 are not needed.

Reference is now made to FIGS. 20 to 26E, which show a mobile automotive spray booth 10 in accordance with a third embodiment of the present invention. Like numerals are used to denote like components.

The spray booth 10 shown in FIGS. 20 to 26E is generally similar to the spray booth 10 shown in FIGS. 1 to 17, and has a collapsible enclosure 12, an air filtration and ventilation system 14, and a fire suppression system 16. As in the first embodiment shown in FIGS. 1 to 17, the collapsible enclosure 12 shown in FIGS. 20 to 26E can move between an extended configuration and a collapsed configuration. When in the extended configuration, the collapsible enclosure 12 can receive an automobile to be spray painted within the collapsible enclosure 12. When in the collapsed configuration, the spray booth 10 has a reduced size and can be more easily transported to a new location. As in the first embodiment shown in FIGS. 1 to 17, the spray booth 10 shown in FIGS. 20 to 26E is configured so that the fire suppression system 16 does not need to be disassembled or removed when moving the collapsible enclosure 12 between the extended configuration and the collapsed configuration.

For ease of reading and to avoid repetition, in the description of FIGS. 20 to 26E below only the features that are different from those of the spray booth 10 shown in FIGS. 1 to 17 will be described in detail.

The first distinctive feature of the spray booth 10 shown in FIGS. 20 to 26E is that the collapsible enclosure 12 includes an extension portion 200. The extension portion 200 increases the size of the collapsible enclosure 12, which allows, for example, two automobiles to be received within the collapsible enclosure 12.

Figure 20:
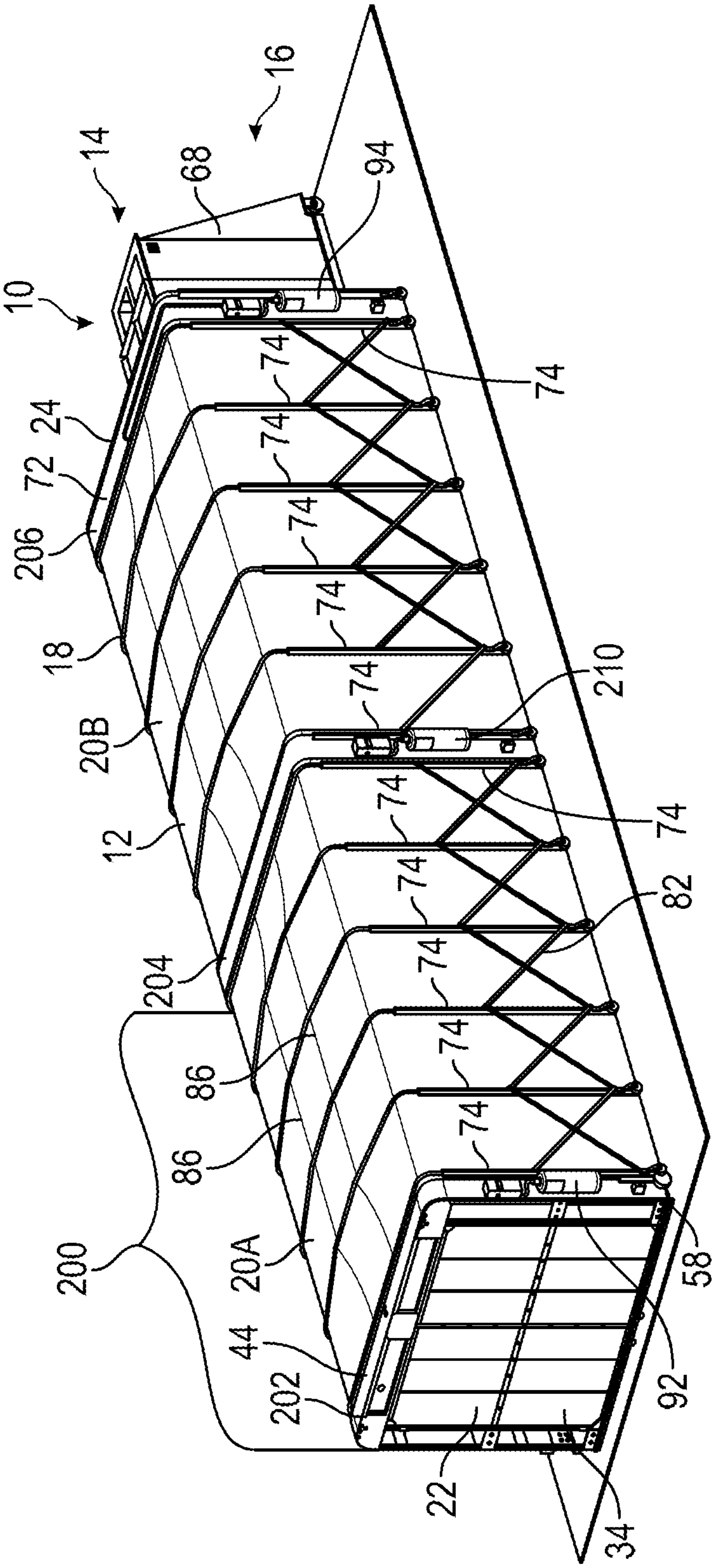
FIG. 20 is a front isometric view of a mobile automotive spray booth in accordance with a third embodiment of the present invention.

As can be seen in FIG. 20, the collapsible frame 18 has a front arch 202, a middle arch 204, and a rear arch 206. Each of the front arch 202, the middle arch 204, and the rear arch 206 comprise a metallic sheet 50 that extends in the longitudinal direction between a first archway defining body or support beam 46 and a second archway defining body or support beam 48. A first flexible cover 20A extends from the front arch 202 to the middle arch 204, and a second flexible cover 20B extends from the middle arch 204 to the rear arch 206. The flexible covers 20A, 20B are clamped between the arches 202, 204, 206 and the support beams 46, 48 to create a fluid tight seal between the arches 202, 204, 206 and the flexible covers 20A, 20B. The first flexible cover 20A and the second flexible cover 20B are each made from a transparent, flexible, and fire retardant material. The middle arch 204 allows for the support of the two cover sections 20A, 20B, doubling the spray booth area 36 as compared to the embodiment shown in FIGS. 1 to 17. The material forming the cover sections 20A, 20B is preferably flame retardant and translucent to allow visibility of a fire alarm strobe 98 from within the enclosure 12.

Six intermediate frame members 74 are positioned between the front arch 202 and the middle arch 204, and an additional six intermediate frame members 74 are positioned between the middle arch 204 and the rear arch 206. The intermediate frame members 74 are arranged outside of the flexible covers 20A, 20B, and support the flexible covers 20A, 20B. The enclosure covers 20A, 20B are preferably laced to the intermediate frame members 74, and are clamped between each arch 202, 204, 206 and the adjacent frame members 74. Preferably, all metal parts are composed of steel, and no aluminum is used.

Figure 24B:
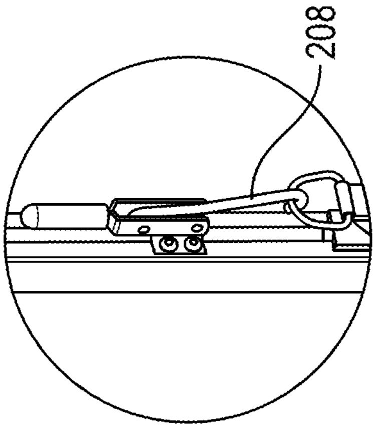
FIG. 24B is a close-up view of area A shown in FIG. 24A.
Figure 24A:
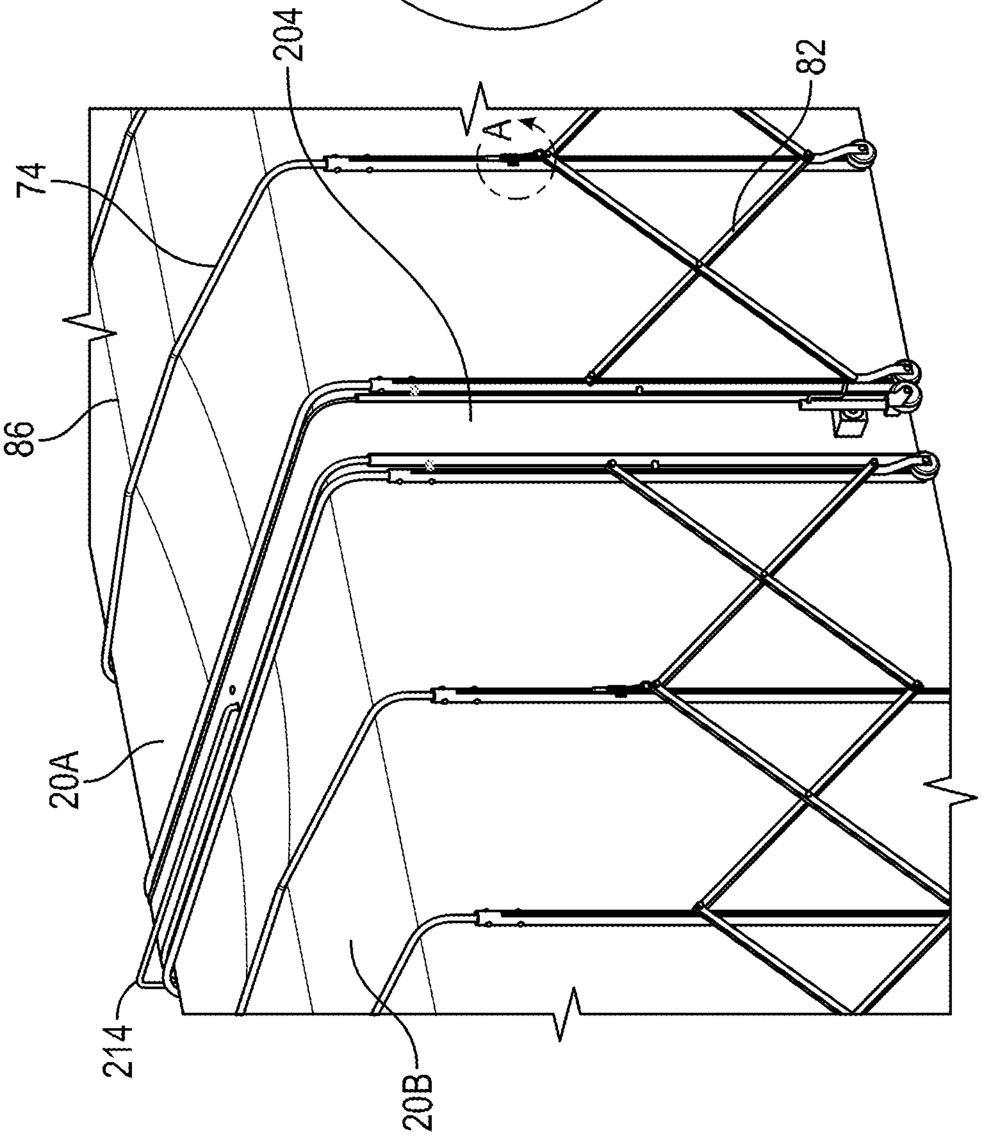
FIG. 24A is a detailed perspective view of a middle arch and the surrounding structures of the mobile automotive spray booth shown in FIG. 20.

As in the first embodiment shown in FIGS. 1 to 17, the intermediate frame members 74 are connected by a pantograph scissor mechanism 82 that allows the intermediate frame members 74 to be moved towards or away from each other in the longitudinal direction, to move the collapsible enclosure 12 between the extended configuration and the collapsed configuration. As can be seen in FIG. 24B, the intermediate frame members 74 are each provided with a mechanical clamp 208. The mechanical clamps 208 each have a locked position and an unlocked position. When in the locked position, the mechanical clamps 208 lock the scissor mechanism 82 in place, preventing the intermediate frame members 74 from being moved towards or away from each other. When in the unlocked position, the scissor mechanism 82 can be moved freely so as to allow the intermediate frame members 74 to be moved towards or away from each other.

The mechanical clamps 208 can lock the scissor mechanism 82 at any desired position. For example, the mechanical clamps 208 may be used to hold the collapsible frame 18 in the extended configuration, to prevent, for example, negative air pressure within the enclosure 12 from collapsing the enclosure 12. The mechanical clamps 208 may also be used, for example, to hold the collapsible frame 18 in the collapsed configuration, to prevent the frame 18 from extending when being moved from one location to another.

As in the embodiment shown in FIGS. 1 to 17, wheels 58 positioned at the ends of the intermediate frame members 74 aid in the extension of the enclosure 12. Jacking casters are preferably placed on either side of each arch 202, 204, 206, and when lowered can be used to move the spray booth 10.

As can be seen in FIG. 20, each of the front arch 202, the middle arch 204, and the rear arch 206 carry a fire extinguisher assembly 92, 94, 210 on the outer, right hand side of the metallic sheet 50. Because each of the arches 202, 204, 206 is extended in the longitudinal direction and does not collapse when the collapsible enclosure 12 moves between the extended configuration and the collapsed configuration, the fire extinguisher assemblies 94, 96, 210 do not need to be removed or disassembled when the collapsible enclosure 12 moves between the extended configuration and the collapsed configuration. Mounting the fire extinguisher assemblies 92, 94, 210 on the outside of the arches 202, 204, 206 preferably helps to prevent sparks from being produced inside of the enclosure 12, which would pose a fire hazard, and also preferably helps to protect the fire extinguisher assemblies 92, 94, 210 from damage.

Figure 25A:
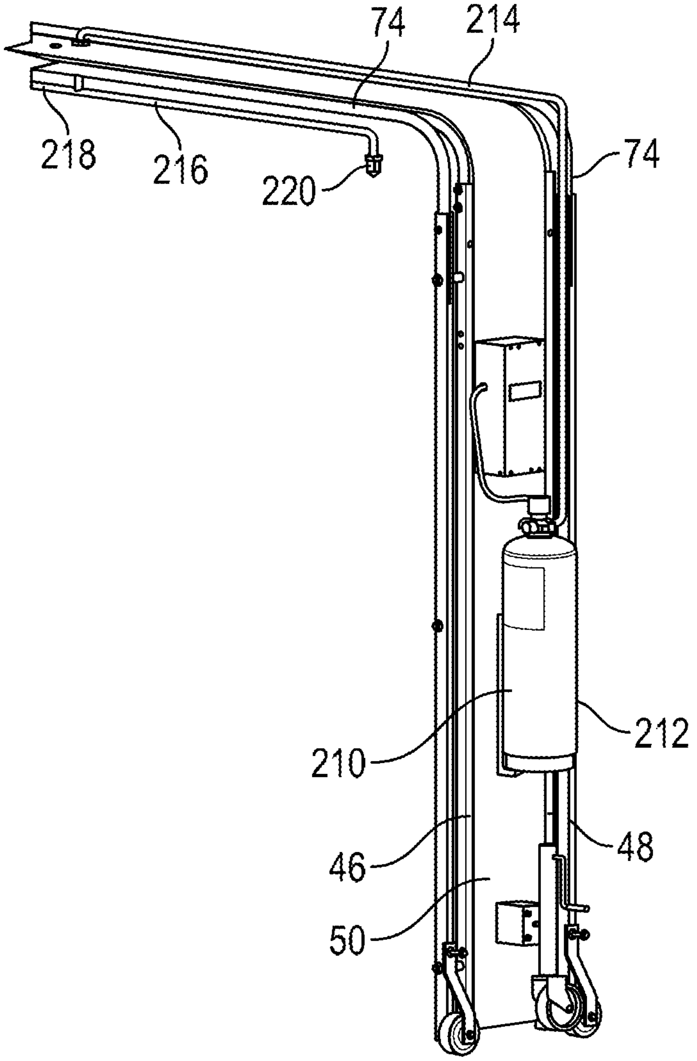
FIG. 25A is a perspective view of a fire extinguisher assembly mounted to the middle arch of the mobile automotive spray booth shown in FIG. 20.
Figure 25B:
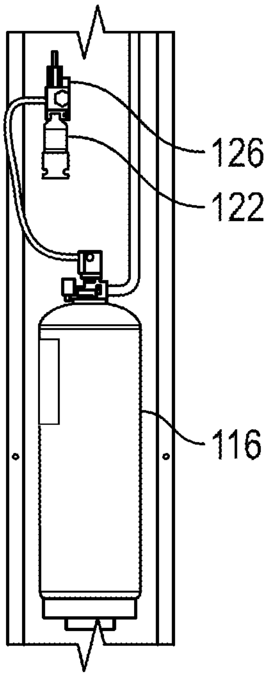
FIG. 25B is a detailed side view of a fire extinguisher assembly mounted to a front arch of the mobile automotive spray booth shown in FIG. 20.
Figure 25C:
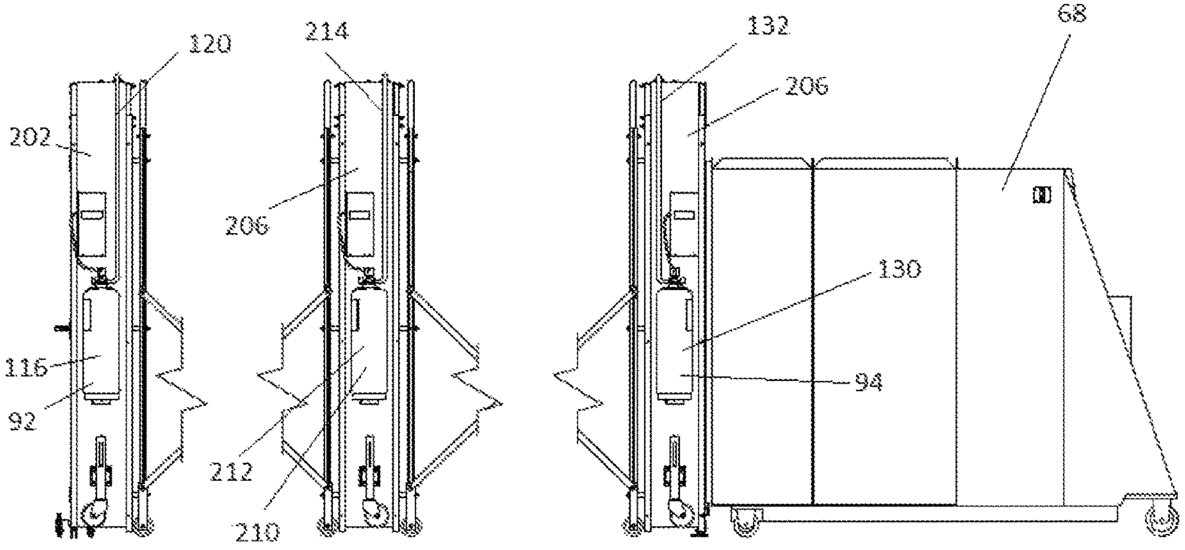
FIG. 25C is a side view of fire extinguisher assemblies mounted to the front arch, the middle arch, and a rear arch of the mobile automotive spray booth shown in FIG. 20.

As can be seen in FIG. 25C, each agent cylinder 116, 130, 212 has an agent delivery pipe 120, 132, 214 attached thereto. The agent delivery pipes 120, 132, 214 each extend upwardly from the agent cylinders 116, 130, 212, and extend horizontally across the tops of the arches 202, 204, 206 to approximately the center of the top of each respective arch 116, 130, 212. The pipes 120, 132, 214 then pass downwardly through each respective arch 116, 130, 212 and into the internal compartment 36 of the collapsible enclosure 12. Each pipe 120, 132, 214 then branches into a right side pipe 216 that extends towards the top right hand side of the enclosure 12 and a left side pipe 218 that extends towards the top left hand side of the enclosure 12. Each right side pipe 216 and left side pipe 218 has at its end a total flood nozzle 220. The pipes 120, 132, 214 and wires are preferably inserted through the arches 202, 204, 206 through quick seals to seal the booth 10 and support the pipes 120, 132, 214. For example, Amerex 1 inch pipe quick seals (P/N 18252) and Amerex wire quick seals (P/N 24737) could be used. The nozzles 220 may, for example, be Amerex total flood nozzles (P/N 16172).

When a fire is detected within the enclosure 12, all three of the fire extinguisher assemblies 92, 94, 210 attached to the arches 116, 130, 212 are activated, which causes the fire extinguishing agent to be expelled from all six of the total flood nozzles 220 positioned inside the collapsible enclosure 12. This rapidly fills the collapsible enclosure 12 with the fire extinguishing agent, putting out the fire inside the enclosure 12. The number and positioning of the nozzles 220, with one nozzle 220 positioned at the front right corner, one at the front left corner, one at the middle right side, one at the middle left side, one at the rear right corner, and one at the rear left corner, preferably helps to fill the collapsible enclosure 12 with the fire extinguishing agent very quickly, and preferably helps to prevent the flexible covers 20A, 20B from igniting.

Figure 26E:
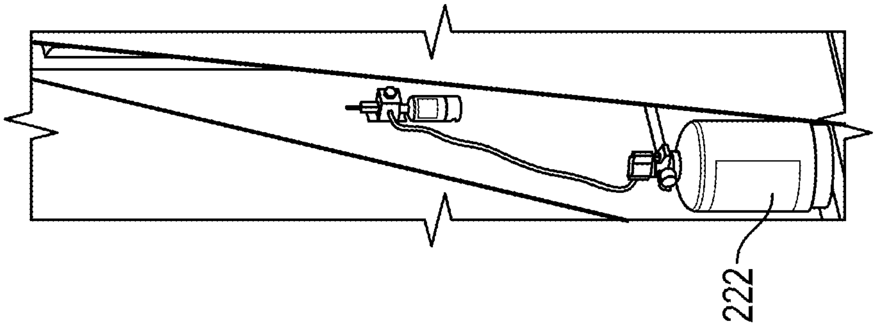
FIG. 26E is a detailed perspective view of a fire extinguisher assembly mounted to the filter unit shown in FIG. 26A.
Figure 26B:
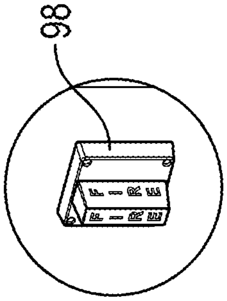
FIG. 26B is a close-up view of area B shown in FIG. 26A.
Figure 26A:
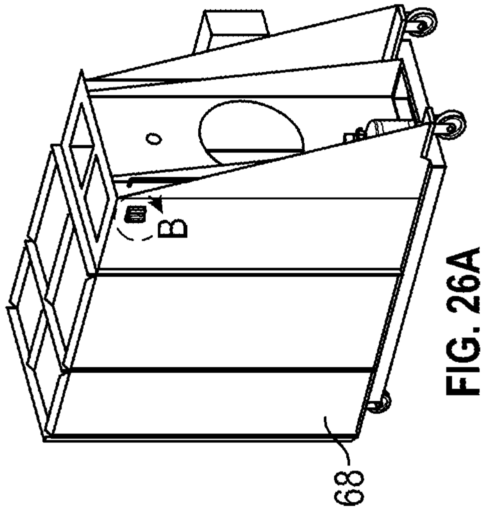
FIG. 26A is a perspective view of a filter unit of the mobile automotive spray booth shown in FIG. 20.
Figure 26D:
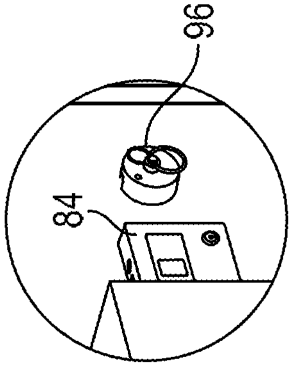
FIG. 26D is a close-up view of area C shown in FIG. 26C.
Figure 26C:
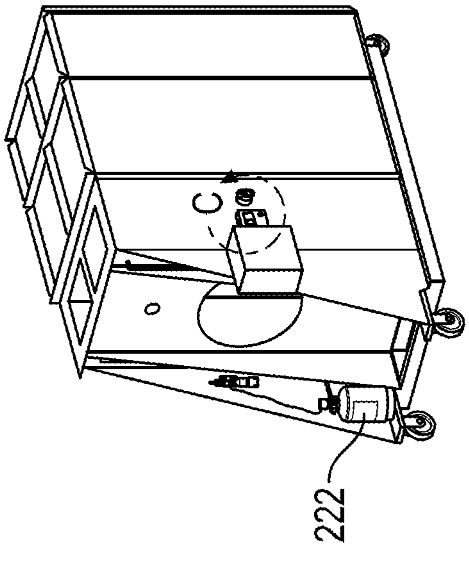
FIG. 26C is a perspective view of the filter unit shown in FIG. 26A.

As can be seen in FIG. 26C, the filter unit 68 is also provided with a fire extinguisher assembly 222. Upon detection of a fire, the fire extinguisher assembly 222 attached to the filter unit 68 is configured to expel the fire extinguishing agent into the filter unit 68 to extinguish any fires within the filter unit 68.

Figure 21:
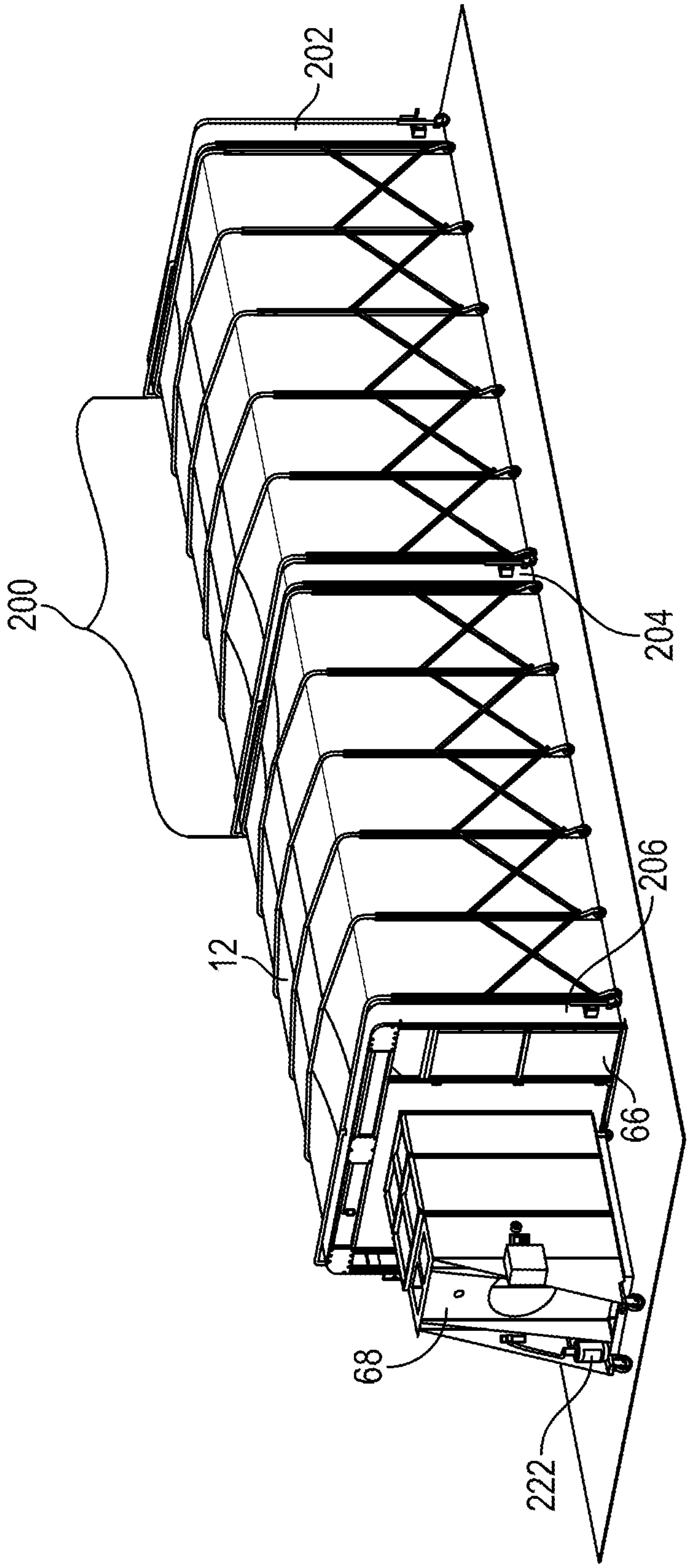
FIG. 21 is a rear isometric view of the mobile automotive spray booth shown in FIG. 20.
Figure 22A:
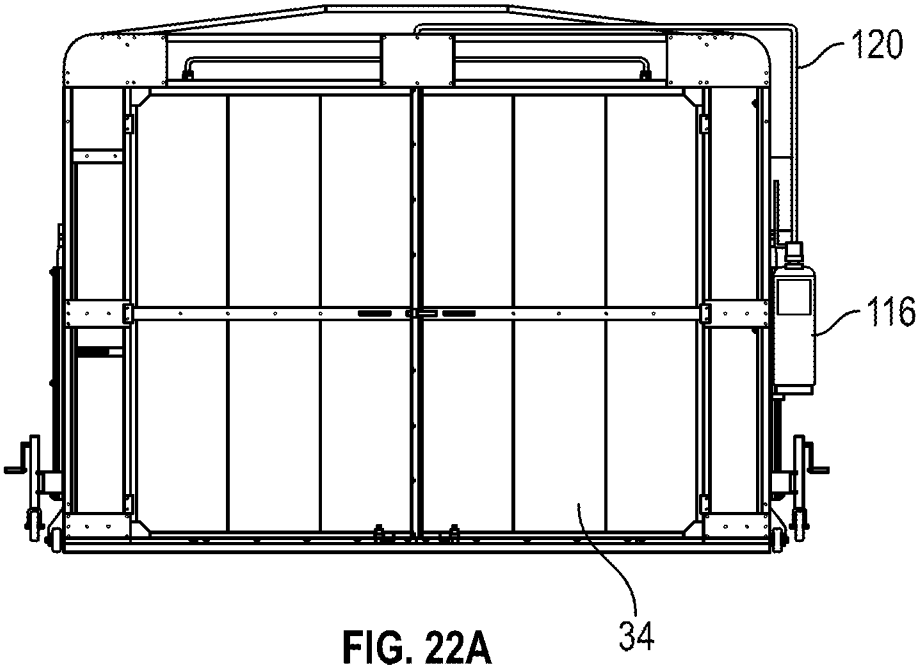
FIG. 22A is a front view of the mobile automotive spray booth shown in FIG. 20.
Figure 22B:
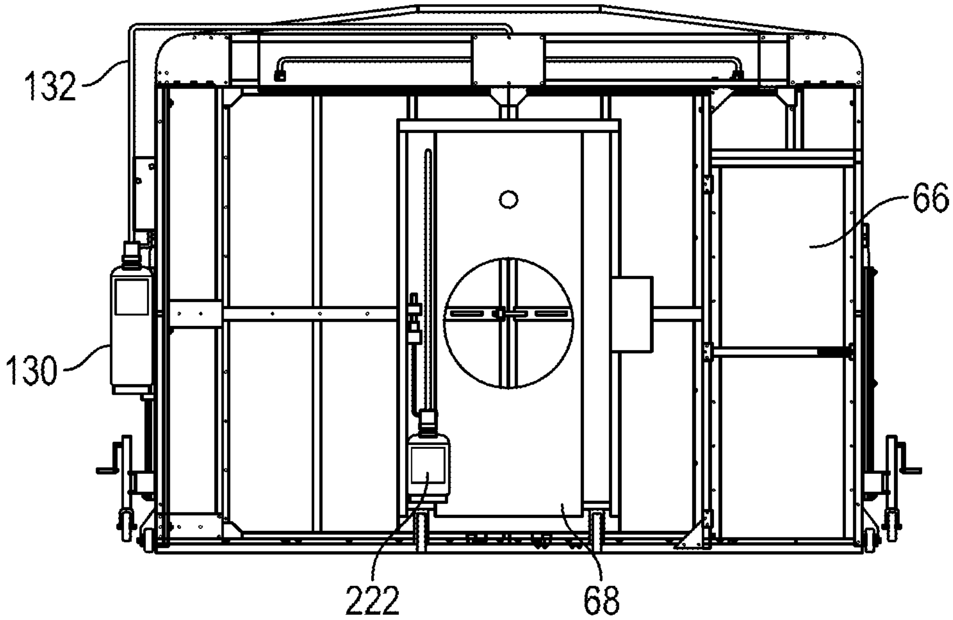
FIG. 22B is a rear view of the mobile automotive spray booth shown in FIG. 20.
Figure 23A:
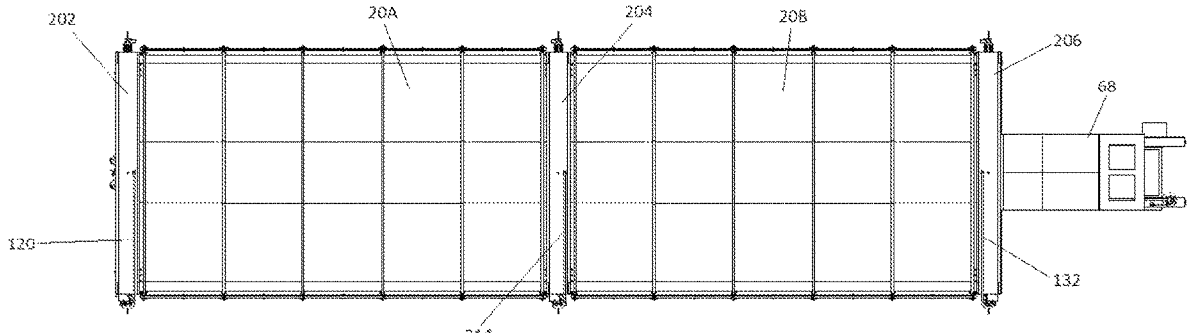
FIG. 23A is a top view of the mobile automotive spray booth shown in FIG. 20.
Figure 23B:
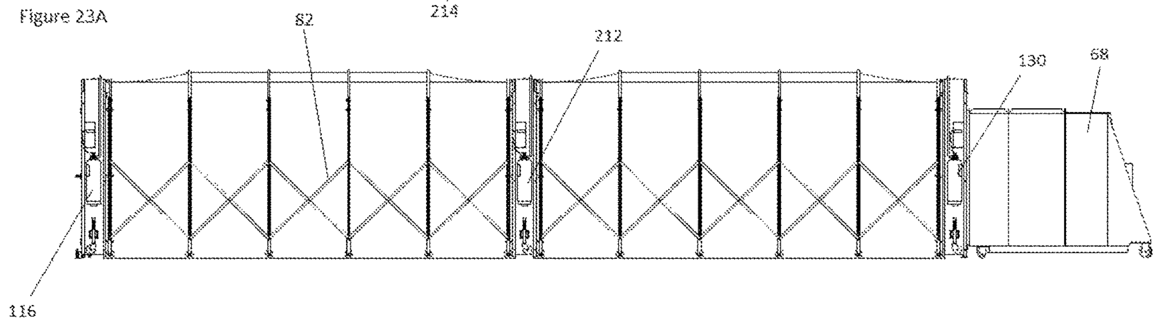
FIG. 23B is a right side view of the mobile automotive spray booth shown in FIG. 20.

As can be seen in FIGS. 20 and 21, two fire detection cables 86 extend in a generally linear path from the filter unit attachment end 24 of the spray booth 10 to the vehicle entrance end 22 of the spray booth 10. The fire detection cables 86 are attached to the flexible covers 20A, 20B and are positioned inside the internal compartment 36 of the collapsible enclosure 12, for detecting a fire within the internal compartment 36. As in the first embodiment shown in FIGS. 1 to 17, the fire detection cables 86 are flexible, and can bend to accommodate movement of the collapsible enclosure 12 between the expanded configuration and the collapsed configuration without requiring removal or disassembly of the fire detection cables 86.

Similarly to the embodiment shown in FIGS. 1 to 17, the fire extinguisher assemblies 92, 94, 210, 222 are activated by wires run from the control unit 84 or strike control panel 84 attached to the filter unit 68. The wires activate a linear actuator which punctures the seal of a nitrogen cylinder. The nitrogen is then ran via tube into the pneumatic control head which is attached to the agent cylinder 116, 130, 212. The gas depresses the cylinder release and dry chemical agent is moved along pipes 120, 132, 214 into the spray booth 10, or in the case of the filter unit fire extinguisher assembly 222, into the filter unit 68. Total flood nozzles 220 are used to disperse the agent throughout the booth 10, extinguishing any possible flames. The cylinders 116, 130, 212 are activated simultaneously to increase the amount of agent released.

As can be seen in FIGS. 26A to 26E, the control unit 84 is attached to the filter unit 68. The control unit 84 is optionally an Amerex Strike Control Panel (P/N 23826), and utilizes the same power that is supplied to the air filter. Wiring from the control unit 84 is run to the pull station 96, horn strobe 98, each of the fire extinguisher assemblies 92, 94, 210, 222, and the fire detection cables 86 or linear heat detectors, which detects the change in heat of present fires. A smaller agent cylinder is attached to the filter unit 68 to extinguish any possible fire within the unit 68. Optionally, the emergency indicator 98 comprises an Amerex Strobe and Horn (P/N 21396); the pull station 96 comprises an Amerex Pull Station (P/N 24290); and the filter unit fire extinguisher assembly 222 comprises an Amerex Strike Control Module (SRM) (P/N 26577) and Linear Actuator (P/N 24448), an Amerex 10 inch nitrogen cylinder (P/N 12856), an Amerex pneumatic control head (P/N 10147), and an Amerex Industrial 18 lb cylinder (P/N 16206).

Reference is now made to FIGS. 27A to 31B, which show a mobile automotive spray booth 10 in accordance with a fourth embodiment of the present invention. Like numerals are used to denote like components.

The spray booth 10 shown in FIGS. 27A to 31B is generally similar to the spray booths 10 shown in FIGS. 1 to 17 and 20 to 26E, and has a collapsible enclosure 12, an air filtration and ventilation system 14, and a fire suppression system 16. As in the first embodiment shown in FIGS. 1 to 17, the collapsible enclosure 12 shown in FIGS. 27A to 31B can move between an extended configuration and a collapsed configuration. When in the extended configuration, the collapsible enclosure 12 can receive an automobile to be spray painted within the collapsible enclosure 12. When in the collapsed configuration, the spray booth 10 has a reduced size and can be more easily transported to a new location. As in the first embodiment shown in FIGS. 1 to 17, the spray booth 10 shown in FIGS. 27A to 31B is configured so that the fire suppression system 16 does not need to be disassembled or removed when moving the collapsible enclosure 12 between the extended configuration and the collapsed configuration.

For ease of reading and to avoid repetition, in the description of FIGS. 27A to 31B below only the features that are different from those of the spray booths 10 shown in FIGS. 1 to 17 and 20 to 26E will be described in detail.

Figure 27A:
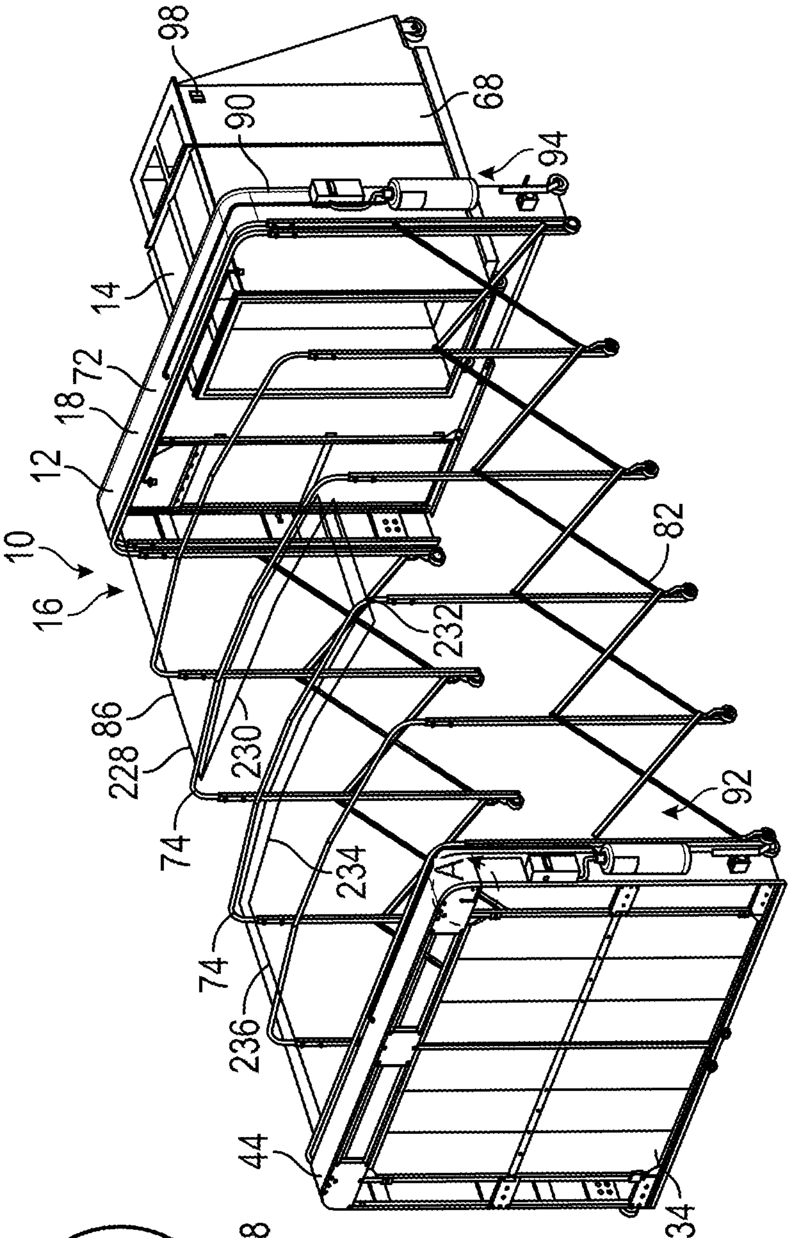
FIG. 27A is a front perspective view of a mobile automotive spray booth in accordance with a fourth embodiment of the present invention, with the flexible cover omitted.
Figure 27B:
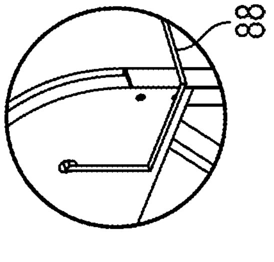
FIG. 27B is a close-up view of area A shown in FIG. 27A.
Figure 28:
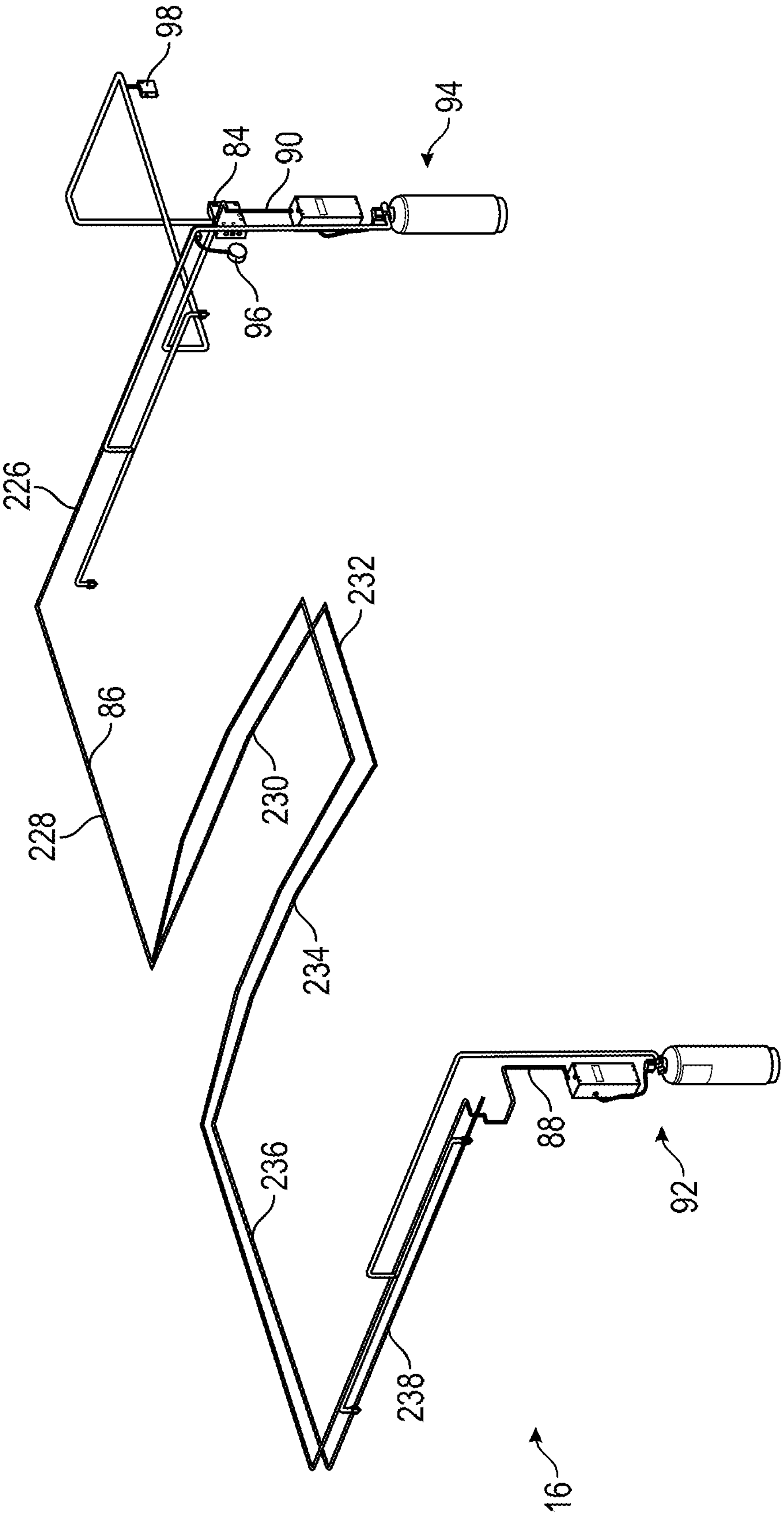
FIG. 28 is a front perspective view of the fire suppression system of the mobile automotive spray booth shown in FIG. 27A.

The main feature of the mobile spray booth 10 shown in FIGS. 27A to 31B that differs from the mobile spray booth 10 shown in FIGS. 1 to 17 is the arrangement of the fire suppression system 16. As is best shown in FIGS. 28 and 30A, the fire suppression system 16 includes a control unit 84, a fire detection cable assembly 86, a first electronic actuator cable 88, a second electronic actuator cable 90, a first fire extinguisher assembly 92, a second fire extinguisher assembly 94, a manual pull station 96, and an emergency indicator 98.

Figures 29A, 29B:
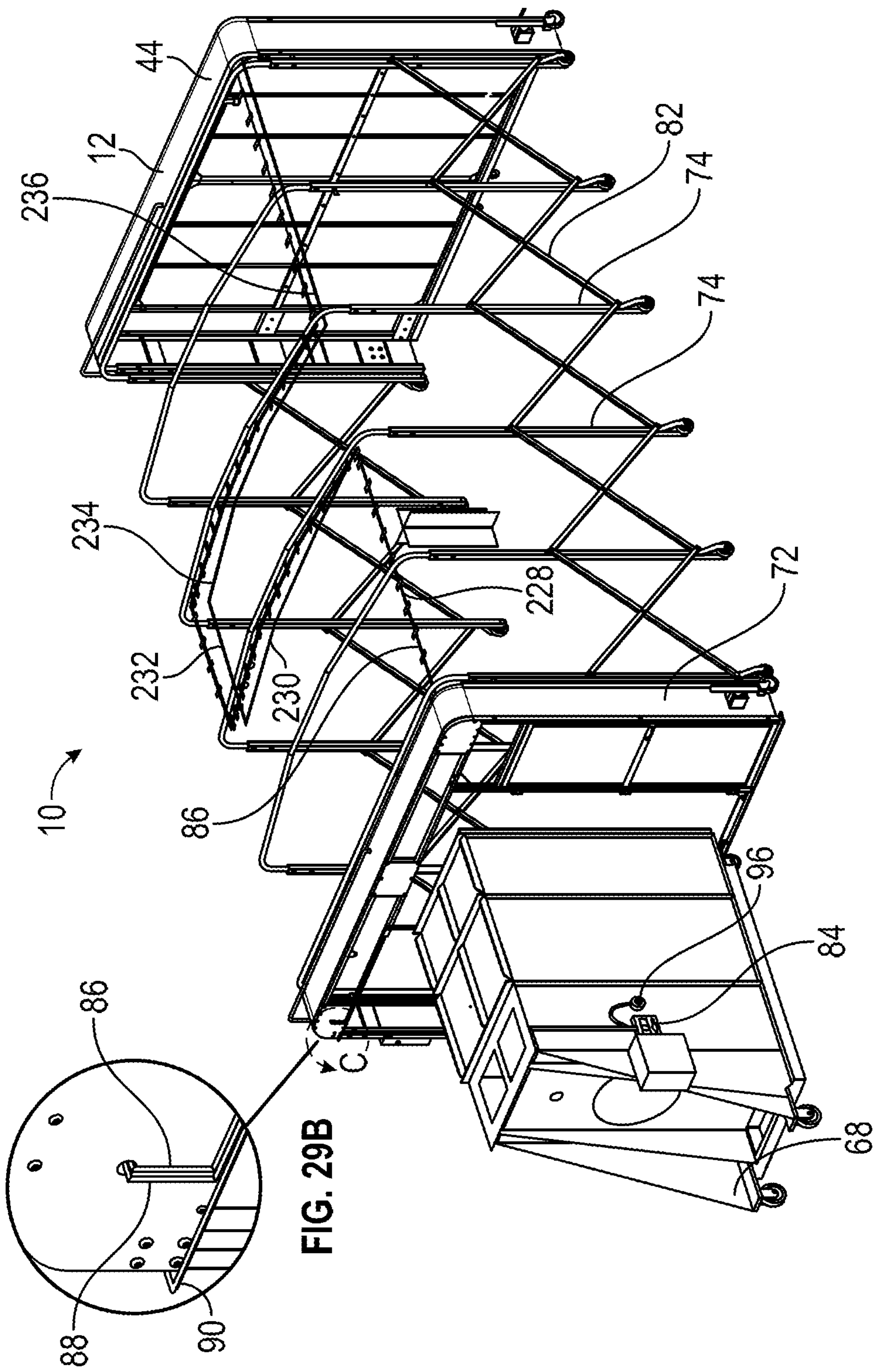
FIG. 29A is a rear perspective view of the mobile automotive spray booth shown in FIG. 27A, with the flexible cover omitted.
FIG. 29B is a close-up view of area C shown in FIG. 29A.

As can be seen in FIG. 29A, the control unit 84 is mounted to the side of the filter unit 68. The control unit 84 performs all of the same functions as in the previous embodiments described above. The manual pull station 96 is also mounted on the side of the filter unit 68 beside the control unit 84. As can be seen in FIG. 27A, the emergency indicator 98 is mounted on the opposite side of the filter unit 68 from the control unit 84. The manual pull station 96 and the emergency indicator 98 are attached to the control unit 84 so that the control unit 84 can detect when the manual pull station 96 has been pulled, and to activate the emergency indicator 98 when the manual pull station 96 is pulled and/or a fire is detected.

Figures 30A, 30B, 30C:
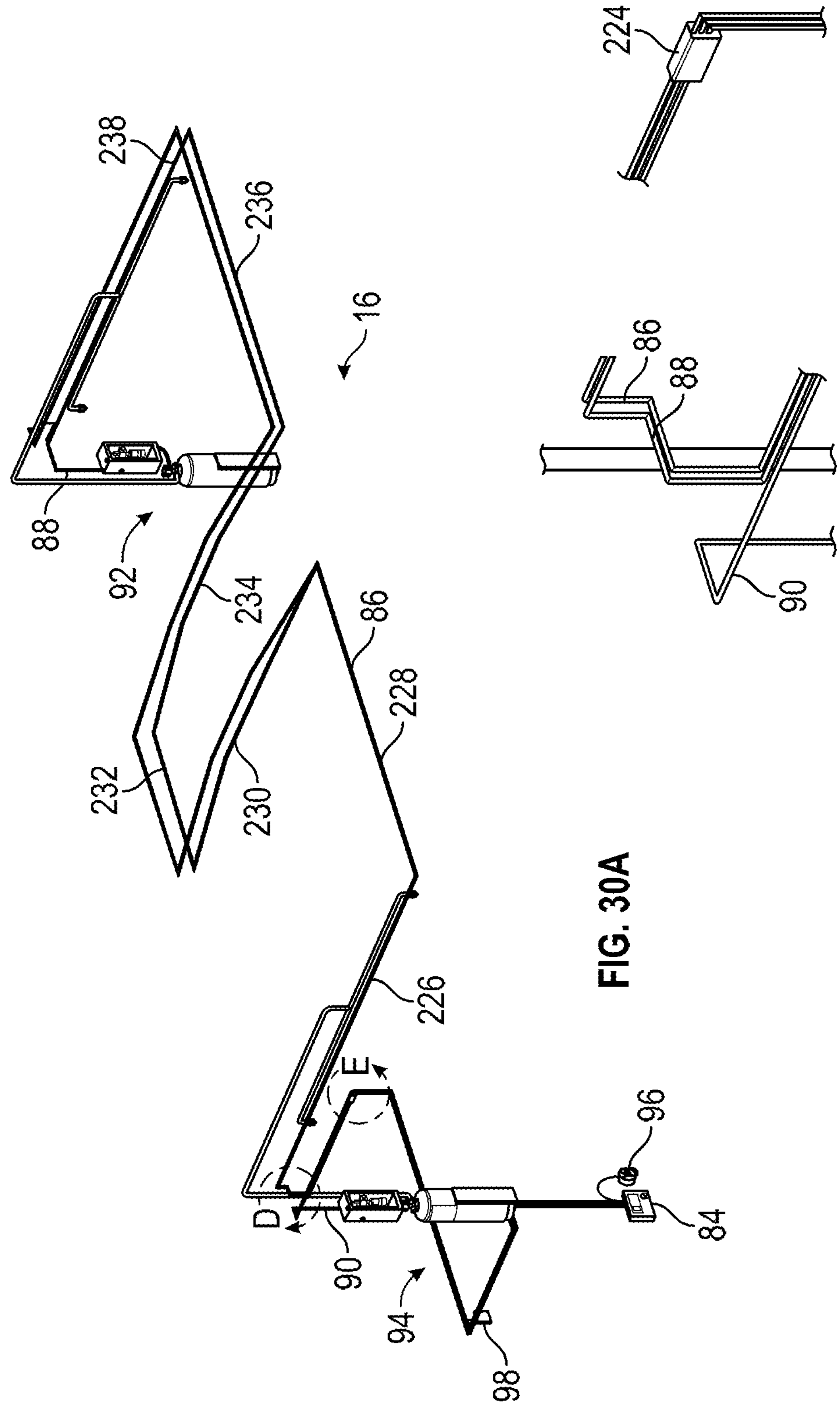
FIG. 30A is a rear perspective view of the fire suppression system of the mobile automotive spray booth shown in FIG. 27A.
FIG. 30B is a close-up view of area D shown in FIG. 30A.
FIG. 30C is a close-up view of area E shown in FIG. 30A.

As is best shown in FIG. 30A, the fire detection cable assembly 86, the first electronic actuator cable 88, and the second electronic actuator cable 90 extend from the control unit 84 towards the collapsible enclosure 12. A wire connection port 224 is preferably provided along the length of the fire detection cable assembly 86, the first electronic actuator cable 88, and the second electronic actuator cable 90 near where the filter unit 68 attaches to the collapsible enclosure 12, as shown in FIG. 30C. The wire connection port 224 allows the wires to be disconnected, to for example allow the filter unit 68 to be disconnected from the collapsible enclosure 12 without having to remove the fire detection cable assembly 86, the first electronic actuator cable 88, and the second electronic actuator cable 90 from the collapsible enclosure 12. The collapsible enclosure 12 and the filter unit 68 can then, for example, be transported to a new location separately from each other, and then reconnected at the new location.

As can be seen in FIGS. 29B and 30A, the second electronic actuator cable 90 remains outside of the collapsible enclosure 12 and attaches to the second fire extinguisher assembly 94 for activating the second fire extinguisher assembly 94 when a fire is detected. The fire detection cable assembly 86 and the first electronic actuator cable 88 enter the collapsible enclosure 12 through a hole in a corner plate of the second terminal frame member 72. Referring to FIGS. 27A and 28, the fire detection cable assembly 86 and the first electronic actuator cable 88 then extend laterally from the top right corner of the second terminal frame member 72 to the top left corner of the second terminal frame member 62; longitudinally from the top left corner of the second terminal frame member 62 to the top left corner of the fourth intermediate frame member 74; laterally from the top left corner of the fourth intermediate frame member 74 to the top right corner of the fourth intermediate frame member 74; longitudinally from the top right corner of the fourth intermediate frame member 74 to the top right corner of the third intermediate frame member 74; laterally from the top right corner of the third intermediate frame member 74 to the top left corner of the third intermediate frame member 74;

longitudinally from the top left corner of the third intermediate frame member 74 to the top left corner of the first terminal frame member 44; and then laterally from the top left corner of the first terminal frame member 44 to the top right corner of the first terminal frame member 44. As can be seen in FIG. 27B, the first electronic actuator cable 88 exits the collapsible enclosure 12 through a hole in a corner plate of the first terminal frame member 44, and attaches to the first fire extinguisher assembly 92 for activating the first fire extinguisher assembly 92 when a fire is detected. The fire detection cable assembly 86 ends at the top right corner of the first terminal frame member 44, and does not exit the collapsible enclosure 12 at the front of the collapsible enclosure 12.

In the embodiment shown in FIGS. 27A to 31B, the fire detection cable assembly 86 comprises a first linear heat detector 226, a first extension cable 228, a second linear heat detector 230, a second extension cable 232, a third linear heat detector 234, a third extension cable 236, and a fourth linear heat detector 238, all connected in series. The first linear heat detector 226 extends laterally from the top right corner of the second terminal frame member 72 to the top left corner of the second terminal frame member 62. The first extension cable 228 extends longitudinally from the top left corner of the second terminal frame member 62 to the top left corner of the fourth intermediate frame member 74. The second linear heat detector 230 extends laterally from the top left corner of the fourth intermediate frame member 74 to the top right corner of the fourth intermediate frame member 74. The second extension cable 232 extends longitudinally from the top right corner of the fourth intermediate frame member 74 to the top right corner of the third intermediate frame member 74. The third linear heat detector 234 extends laterally from the top right corner of the third intermediate frame member 74 to the top left corner of the third intermediate frame member 74. The third extension cable 236 extends longitudinally from the top left corner of the third intermediate frame member 74 to the top left corner of the first terminal frame member 44. The fourth linear heat detector 238 extends laterally from the top left corner of the first terminal frame member 44 to the top right corner of the first terminal frame member 44.

The first linear heat detector 226, the second linear heat detector 230, the third linear heat detector 234, and the fourth linear heat detector 238 can detect a fire within the collapsible enclosure 12 in the same manner as in the first embodiment of the invention described above. The first extension cable 228, the second extension cable 232, and the third extension cable 236 are not themselves able to detect a fire within the collapsible enclosure 12, and are provided to connect the first linear heat detector 226, the second linear heat detector 230, the third linear heat detector 234, and the fourth linear heat detector 238 together. Arranging the linear heat detectors 226, 230, 234, 238 to extend only in the lateral direction, with the extension cables 228, 232, 236 extending in the longitudinal direction, prevents the linear heat detectors 226, 230, 234, 238 from having to bend when the collapsible enclosure 12 is moved between the extended and the collapsed configurations. This preferably helps to prevent the linear heat detectors 226, 230, 234, 238 from crimping or otherwise becoming damaged (e.g. damaging the coating) when the collapsible enclosure 12 is moved between the extended and the collapsed configurations. The extension cables 228, 232, 236 bend when the collapsible enclosure 12 is collapsed.

Figure 31A:
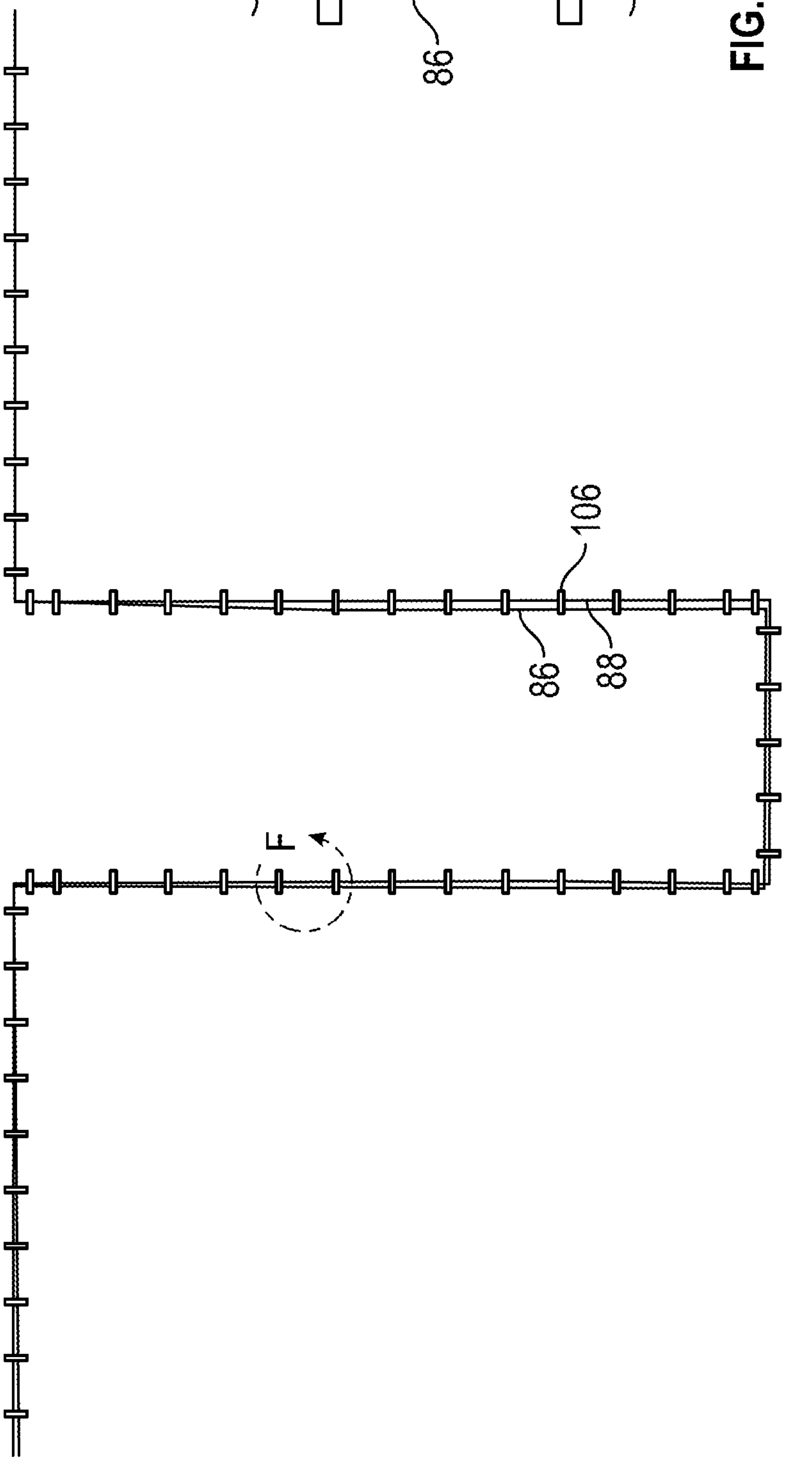
FIG. 31A is a top plan view of the wiring that extends through the collapsible enclosure of the mobile automotive spray booth shown in FIG. 27A.
Figure 31B:
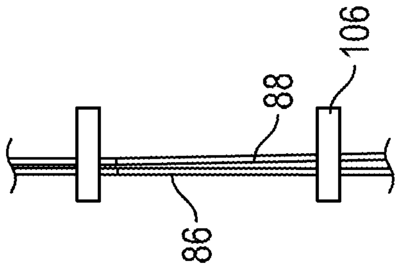
FIG. 31B is a close-up view of area F shown in FIG. 31A.

As can be seen in FIG. 31A, a plurality of wire harnesses 106 are provided for holding the fire detection cable assembly 86 and the first electronic actuator cable 88 to the inside surface of the flexible cover 20. The wire harnesses 106 can, for example, be spaced about 10 inches apart from each other.

The first fire extinguisher assembly 92 and the second fire extinguisher assembly 94 of the mobile automotive spray booth 10 shown in FIGS. 27A to 31B correspond identically to the first fire extinguisher assembly 92 and the second fire extinguisher assembly 94 of the mobile automotive spray booth 10 shown in FIGS. 20 to 26E. As in the previous embodiments, when a fire is detected in the collapsible enclosure 12, the fire extinguisher assemblies 92, 94 are activated by the control unit 84 to flood the collapsible enclosure 12 with a fire extinguishing agent and thereby put out the fire.

Although this disclosure has described and illustrated certain preferred embodiments of the invention, it is to be understood that the invention is not restricted to these particular embodiments. Rather, the invention includes all embodiments which are functional, electrical, or mechanical equivalents of the specific embodiments and features that have been described and illustrated herein.

I claim:

1. A mobile automotive spray booth comprising:

a collapsible enclosure for receiving a vehicle to be spray painted, the collapsible enclosure having a collapsed configuration and an expanded configuration; and a fire suppression system comprising:

a control unit;

a fire detection assembly in communication with the control unit; and a fire extinguisher assembly in communication with the control unit;

wherein the fire detection assembly extends across at least a portion of the collapsible enclosure, and is configured to detect a fire within the collapsible enclosure;

wherein the control unit is configured to activate the fire extinguisher assembly to extinguish the fire upon detection of the fire by the fire detection assembly;

wherein the fire detection assembly is configured to bend to allow the collapsible enclosure to collapse from the expanded configuration to the collapsed configuration without removal or disassembly of the fire detection assembly;

wherein the fire extinguisher assembly comprises:

an agent cylinder containing a fire extinguishing agent; and an electronic actuator that is operatively connected to the agent cylinder;

wherein the fire suppression system further comprises an electronic actuator cable that extends from the control unit to the electronic actuator:

wherein the control unit is configured to send an electronic activation signal to the electronic actuator via the electronic actuator cable upon detection of the fire by the fire detection assembly:

wherein the electronic actuator is configured to activate the agent cylinder to expel the fire extinguishing agent upon receipt of the electronic activation signal from the control unit;

wherein the electronic actuator cable extends across at least part of the collapsible enclosure, and is configured to bend to allow the collapsible enclosure to collapse from the expanded configuration to the collapsed configuration without removal or disassembly of the electronic actuator cable;

wherein the mobile automotive spray booth has a first end and a second end;

wherein the fire extinguisher assembly is located at the first end and the control unit is located at the second end;

wherein the first end is closer to the second end when the collapsible enclosure is in the collapsed configuration than when the collapsible enclosure is in the expanded configuration;

wherein the collapsible enclosure comprises a flexible cover that is supported by a collapsible frame;

wherein the collapsible frame has an extended length in a longitudinal direction when the collapsible enclosure is in the expanded configuration;

wherein the collapsible frame has a reduced length in the longitudinal direction when the collapsible enclosure is in the collapsed configuration, the extended length being greater than the reduced length;

wherein the collapsible frame has a terminal frame member located at the first end of the mobile automotive spray booth;

wherein the fire extinguisher assembly is mounted to the terminal frame member;

wherein the terminal frame member has a width in the longitudinal direction that remains unchanged when the collapsible enclosure moves between the collapsed configuration and the expanded configuration, so as to allow the collapsible enclosure to collapse from the expanded configuration to the collapsed configuration without removal or disassembly of the fire extinguisher assembly;

wherein the terminal frame member comprises:

a first archway defining body;

a second archway defining body; and at least one metallic sheet or panel;

wherein the second archway defining body is spaced from the first archway defining body in the longitudinal direction;

wherein the at least one metallic sheet or panel extends between the first archway defining body and the second archway defining body in the longitudinal direction;

wherein the fire extinguisher assembly is mounted to the at least one metallic sheet or panel, without piercing the flexible cover;

wherein the terminal frame member has a right side portion, a top portion, and a left side portion;

wherein the fire extinguisher assembly further comprises at least one nozzle that is operatively connected to the agent cylinder for discharge of the fire extinguishing agent into an internal compartment of the collapsible enclosure upon activation of the agent cylinder;

wherein the at least one nozzle is mounted to the top portion of the terminal frame member;

wherein the at least one nozzle is configured to discharge the fire extinguishing agent in a multidirectional spray that encompasses at least half of an internal volume of the internal compartment and extends in the longitudinal direction towards the second end of the mobile automotive spray booth for at least half of the extended length of the collapsible frame:

the mobile automotive spray booth further comprising an air filtration and ventilation system for directing air through the collapsible enclosure and filtering air expelled from the collapsible enclosure;

wherein the fire extinguisher assembly is a first fire extinguisher assembly, the fire suppression system further comprising a second fire extinguisher assembly;

wherein the agent cylinder is a first agent cylinder, the electronic actuator is a first electronic actuator, and the at least one nozzle is a first nozzle or set of nozzles;

wherein the first fire extinguisher assembly further comprises a first nitrogen actuation cylinder and a first actuation hose;

wherein the first electronic actuator is operatively connected to the first nitrogen actuation cylinder, the first electronic actuator being configured to activate the first nitrogen actuation cylinder upon receipt of the electronic activation signal from the control unit;

wherein the first nitrogen actuation cylinder is configured to, upon activation of the first nitrogen actuation cylinder, deliver pressurized nitrogen to the first agent cylinder via the first actuation hose to thereby activate the first agent cylinder;

wherein the second fire extinguisher assembly comprises:

a second agent cylinder containing the fire extinguishing agent;

a second nozzle or set of nozzles that is operatively connected to the second agent cylinder for discharge of the fire extinguishing agent into the internal compartment of the collapsible enclosure upon activation of the second agent cylinder;

a second nitrogen actuation cylinder;

a second actuation hose; and a second electronic actuator in communication with the control unit;

wherein the second electronic actuator is configured to activate the second nitrogen actuation cylinder upon receipt of activation instructions from the control unit;

wherein the second nitrogen actuation cylinder is configured to, upon activation of the second nitrogen actuation cylinder, deliver pressurized nitrogen to the second agent cylinder via the second actuation hose to thereby activate the second agent cylinder;

wherein the air filtration and ventilation system comprises a filter unit that carries one or more filters for filtering the air expelled from the collapsible enclosure, the filter unit being located at the second end of the mobile automotive spray booth;

wherein the collapsible enclosure has a filter unit attachment end and a vehicle entrance end, the vehicle entrance end being located at the first end of the mobile automotive spray booth and the filter unit attachment end being located at the second end of the mobile automotive spray booth;

wherein the terminal frame member is a first terminal frame member, the collapsible frame further comprising a second terminal frame member located at the filter unit attachment end of the collapsible enclosure;

wherein the second terminal frame member has a right side portion, a top portion, and a left side portion;

wherein the second nozzle or set of nozzles is mounted to the top portion of the second terminal frame member without piercing the flexible cover;

wherein the second nozzle or set of nozzles is configured to discharge the fire extinguishing agent in a multidirectional spray that encompasses at least half of the internal volume of the internal compartment and extends in the longitudinal direction towards the vehicle entrance end of the collapsible enclosure for at least half of the extended length of the collapsible frame; and wherein the second terminal frame member has a width in the longitudinal direction that remains unchanged when the collapsible enclosure moves between the collapsed configuration and the expanded configuration, so as to allow the collapsible enclosure to collapse from the expanded configuration to the collapsed configuration without removal or disassembly of the second nozzle or set of nozzles.

2. The mobile automotive spray booth according to claim 1, wherein the filter unit also carries the control unit, a fan, a sensor device, and a drive unit;

wherein the drive unit provides electric power to the control unit, to the fan, to the sensor device, and to a spray paint apparatus for spray painting the vehicle; and wherein the drive unit is configured to perform a diagnostic routine to confirm that the fire suppression system and the sensor device are operational before providing power to the spray paint apparatus.

3. The mobile automotive spray booth according to claim 2, wherein the filter unit comprises a horizontal base that carries a fan support member, a funnel member, and a filter assembly;

wherein the fan support member comprises:

a vertical plate having a central opening for carrying the fan; and a right side vertical support rib and a left side vertical support rib that extend from a right side of the vertical plate and a left side of the vertical plate, respectively, the right side vertical support rib and the left side vertical support rib extending away from the filter unit attachment end of the collapsible enclosure;

wherein the funnel member has a funnel shaped body with a first open end and a larger second open end, the first open end positioned adjacent to an air intake side of the fan and the second open end positioned adjacent to the filter assembly;

wherein the filter assembly comprises a first stage filter, a second stage filter, a third stage filter, and a fourth stage filter;

wherein the first stage filter is positioned adjacent to the filter unit attachment end of the collapsible enclosure for receiving air from the internal compartment of the collapsible enclosure;

wherein the second stage filter is positioned adjacent to the first stage filter for receiving air filtered by the first stage filter;

wherein the third stage filter is positioned adjacent to the second stage filter for receiving air filtered by the second stage filter;

wherein the fourth stage filter is positioned adjacent to the third stage filter for receiving air filtered by the third stage filter;

wherein the second open end of the funnel member is positioned adjacent to the fourth stage filter for receiving air filtered by the fourth stage filter;

wherein the fan draws air from the internal compartment through the filter assembly and the funnel member, and exhausts filtered air out of the filter unit;

wherein the sensor device is mounted on the filter unit for detecting contaminants in the exhausted filtered air;

wherein the first stage filter comprises an overspray arrestor;

wherein the second stage filter comprises a MERV 13 multi-pocket filter;

wherein the third stage filter comprises a carbon filter; and wherein the fourth stage filter comprises a MERV 8 pleated panel filter.

4. The mobile automotive spray booth according to claim 3, wherein the fire detection assembly extends at least from the filter unit attachment end of the collapsible enclosure to the vehicle entrance end of the collapsible enclosure;

wherein the fire detection assembly has at least one transverse portion that extends across a top portion of the collapsible enclosure from a left side portion of the collapsible enclosure to a right side portion of the collapsible enclosure;

wherein the at least one transverse portion comprises:

a first transverse portion;

a second transverse portion that is spaced from the first transverse portion, and is located closer to the vehicle entrance end than the first transverse portion is to the vehicle entrance end;

a third transverse portion that is spaced from the second transverse portion, and is located closer to the vehicle entrance end than the second transverse portion is to the vehicle entrance end; and a fourth transverse portion that is spaced from the third transverse portion, and is located closer to the vehicle entrance end than the third transverse portion is to the vehicle entrance end.

5. The mobile automotive spray booth according to claim 4, wherein the flexible cover is fire retardant;

wherein the fire detection assembly is attached to the flexible cover by straps, without piercing the flexible cover;

wherein the fire detection assembly is detachable from the flexible cover by unfastening the straps;

wherein the fire detection assembly comprises a linear heat detector with two internal conductors that make contact in an overheat condition;

wherein the fire suppression system further comprises a manual pull station that is in communication with the control unit; and wherein the control unit is configured to activate the fire extinguisher assembly to extinguish the fire upon manual activation of the manual pull station.

6. The mobile automotive spray booth according to claim 1, wherein the fire detection assembly extends at least from the filter unit attachment end of the collapsible enclosure to the vehicle entrance end of the collapsible enclosure.

7. The mobile automotive spray booth according to claim 6, wherein the fire detection assembly has at least one transverse portion that extends across a top portion of the collapsible enclosure from a left side portion of the collapsible enclosure to a right side portion of the collapsible enclosure.

8. The mobile automotive spray booth according to claim 7, wherein the at least one transverse portion comprises:

a first transverse portion;

a second transverse portion that is spaced from the first transverse portion, and is located closer to the vehicle entrance end than the first transverse portion is to the vehicle entrance end;

a third transverse portion that is spaced from the second transverse portion, and is located closer to the vehicle entrance end than the second transverse portion is to the vehicle entrance end; and a fourth transverse portion that is spaced from the third transverse portion, and is located closer to the vehicle entrance end than the third transverse portion is to the vehicle entrance end.

9. The mobile automotive spray booth according to claim 1, wherein the flexible cover is fire retardant; and wherein the fire detection assembly is attached to the flexible cover by straps, without piercing the flexible cover.

10. The mobile automotive spray booth according to claim 9, wherein the fire detection assembly is detachable from the flexible cover by unfastening the straps.

11. The mobile automotive spray booth according to claim 1, wherein the fire detection assembly comprises a linear heat detector with two internal conductors that make contact in an overheat condition.

12. The mobile automotive spray booth according to claim 1, wherein the fire suppression system further comprises a manual pull station that is in communication with the control unit; and wherein the control unit is configured to activate the fire extinguisher assembly to extinguish the fire upon manual activation of the manual pull station.

* * * * *